(12) United States Patent  
Pellicer

(10) Patent No.: US 9,604,564 B1
(45) Date of Patent: Mar. 28, 2017

(54) SLEEPING COMPARTMENT FOR A RECREATIONAL VEHICLE

(71) Applicant: Fernando Pellicer, Dorval (CA)

(72) Inventor: Fernando Pellicer, Dorval (CA)

( * ) Notice: Subject to any disclaimer, the term of this patent is extended or adjusted under 35 U.S.C. 154(b) by 0 days.

(21) Appl. No.: 15/078,357

(22) Filed: Mar. 23, 2016

(51) Int. Cl.
B60P 3/34 (2006.01)
B60P 3/39 (2006.01)
B62D 35/00 (2006.01)

(52) U.S. Cl.
CPC ........ B60P 3/39 (2013.01); B60P 3/34 (2013.01); B62D 35/002 (2013.01)

(58) Field of Classification Search
CPC ... B60J 7/16; B60J 7/165; B60P 3/341; B60P 3/343; B60P 3/36; B60P 3/38; B60P 3/39; B60P 3/32; B60P 3/34; B62D 21/14; B62D 21/20; B62D 47/00; B62D 47/003
USPC ......... 296/26.01, 26.02, 26.04, 26.05, 26.08, 296/26.09, 165, 174, 175, 173, 156, 164, 296/168, 171, 172, 176; D12/89, 99, 100
See application file for complete search history.

(56) References Cited

U.S. PATENT DOCUMENTS

| | | | | |
|---|---|---|---|---|
| 1,871,871 A * | 8/1932 | Woods | ............... | B60P 3/38 135/117 |
| 1,964,894 A * | 7/1934 | Rohne | ............... | B60P 3/0257 296/26.02 |
| 2,243,659 A * | 5/1941 | Thompson | ............... | B60P 3/38 296/175 |
| 3,572,809 A * | 3/1971 | Buland | ............... | B60P 3/34 296/175 |
| 3,582,129 A * | 6/1971 | Frank | ............... | B60P 3/34 296/164 |
| 3,744,841 A * | 7/1973 | Schmidt | ............... | B60P 3/34 296/26.04 |
| 3,802,732 A * | 4/1974 | McKee | ............... | B60P 3/341 296/176 |
| 3,850,470 A * | 11/1974 | Trelle | ............... | B60P 3/32 296/165 |
| 4,210,360 A * | 7/1980 | Powers | ............... | B60P 3/42 296/165 |
| 4,222,604 A | 9/1980 | Human | | |
| 5,078,441 A * | 1/1992 | Borskey | ............... | B60J 7/165 292/DIG. 72 |
| 5,248,180 A | 9/1993 | Hussaini | | |
| 5,491,933 A | 2/1996 | Miller et al. | | |
| 5,658,032 A * | 8/1997 | Gardner | ............... | B60P 3/34 296/175 |
| 6,302,475 B1 * | 10/2001 | Anderson | ............... | B60P 3/34 296/175 |

(Continued)

Primary Examiner — Gregory Blankenship
(74) Attorney, Agent, or Firm — Philip Swain; IPSIS, Inc.

(57) ABSTRACT

A sleeping compartment for a recreational vehicle, which has a cabin with a ceiling, a rear wall, two doors, seats, a windshield, and an expandable habitation unit located behind the rear wall. The sleeping compartment includes a roof, which is sized and shaped to cover the expandable habitation unit and the cabin, the roof having a front roof portion and a rear roof portion. The roof is actuatable between a closed configuration and an open configuration. A sleeping berth is separate from and independent to the expandable habitation unit. The sleeping berth has a sleeping surface located on top of the ceiling. The front roof portion is moveably connected to the cabin above the windshield and the doors to permit movement of the roof between the open and closed configuration.

19 Claims, 23 Drawing Sheets

(56) References Cited

U.S. PATENT DOCUMENTS

| | | | |
|---|---|---|---|
| 6,325,447 B1* | 12/2001 | Kuo | B60P 3/341 |
| | | | 296/160 |
| 6,527,324 B2 | 3/2003 | McManus et al. | |
| 6,772,563 B2* | 8/2004 | Kuhn | E04B 1/3444 |
| | | | 220/1.5 |
| 7,226,116 B2 | 6/2007 | Jones | |
| 7,644,971 B1* | 1/2010 | Ludwick | B60P 3/34 |
| | | | 296/26.02 |
| 7,802,834 B2 | 9/2010 | Cadena et al. | |
| 8,267,455 B1* | 9/2012 | Ludwick | B60P 3/34 |
| | | | 296/26.04 |
| 8,484,908 B2* | 7/2013 | Hache | B60P 3/14 |
| | | | 137/234.6 |
| 9,302,605 B1* | 4/2016 | Van Pelt | B60P 3/34 |
| 2002/0089212 A1* | 7/2002 | Garceau | B60P 3/34 |
| | | | 296/165 |
| 2002/0125736 A1* | 9/2002 | Messano | B60P 3/34 |
| | | | 296/165 |
| 2002/0135204 A1* | 9/2002 | Okamoto | B60P 3/341 |
| | | | 296/165 |
| 2003/0115808 A1* | 6/2003 | Morrow | B60P 3/34 |
| | | | 52/64 |
| 2004/0066060 A1* | 4/2004 | Rasmussen | B60P 3/34 |
| | | | 296/165 |
| 2006/0131912 A1* | 6/2006 | MacLean | B60P 3/34 |
| | | | 296/26.13 |
| 2007/0257511 A1* | 11/2007 | Dickenson | B60P 3/34 |
| | | | 296/165 |
| 2009/0102231 A1* | 4/2009 | Atcravi | B60P 3/34 |
| | | | 296/175 |
| 2011/0057475 A1* | 3/2011 | Cunningham | B60P 3/07 |
| | | | 296/165 |
| 2015/0102632 A1* | 4/2015 | Pham | B60P 3/34 |
| | | | 296/175 |

* cited by examiner

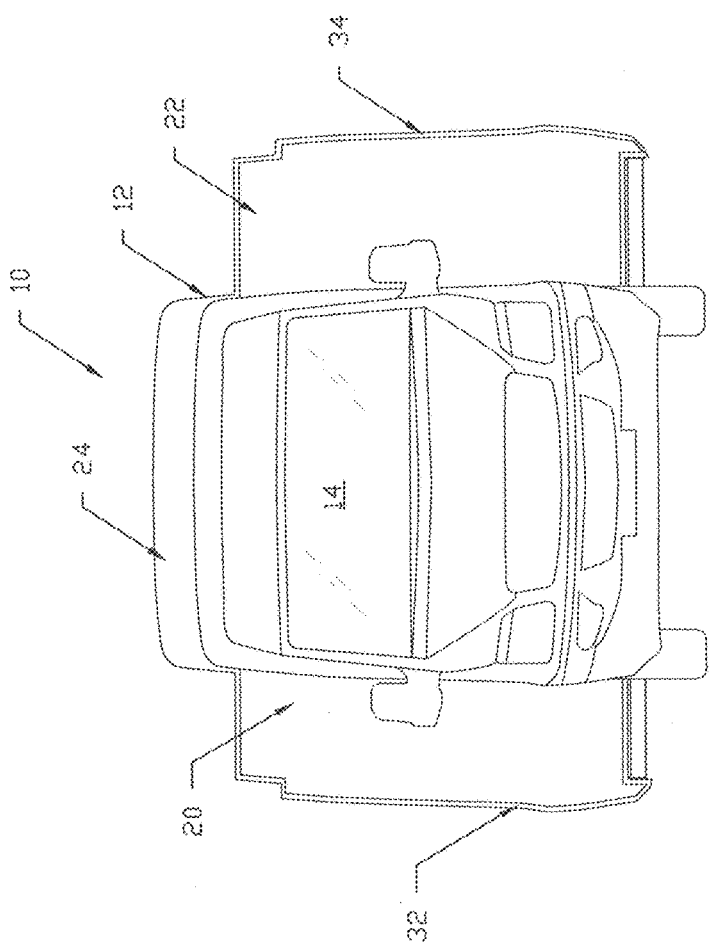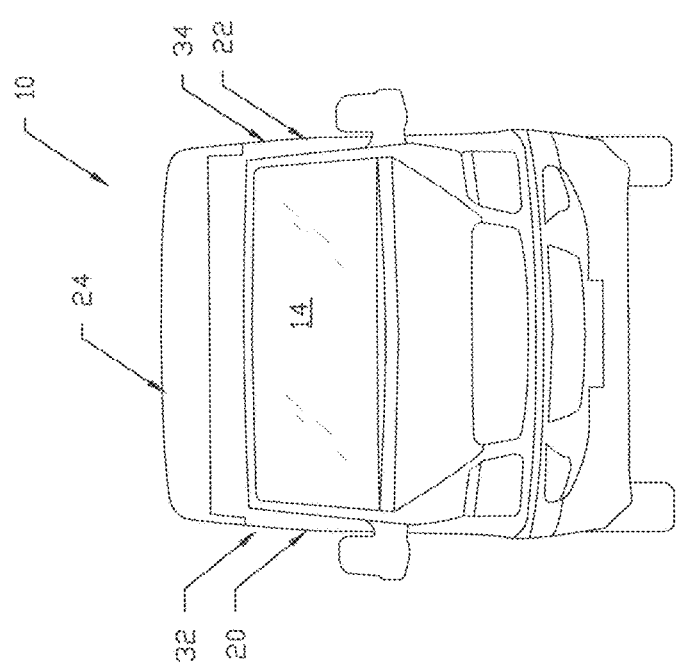
FIG. 3

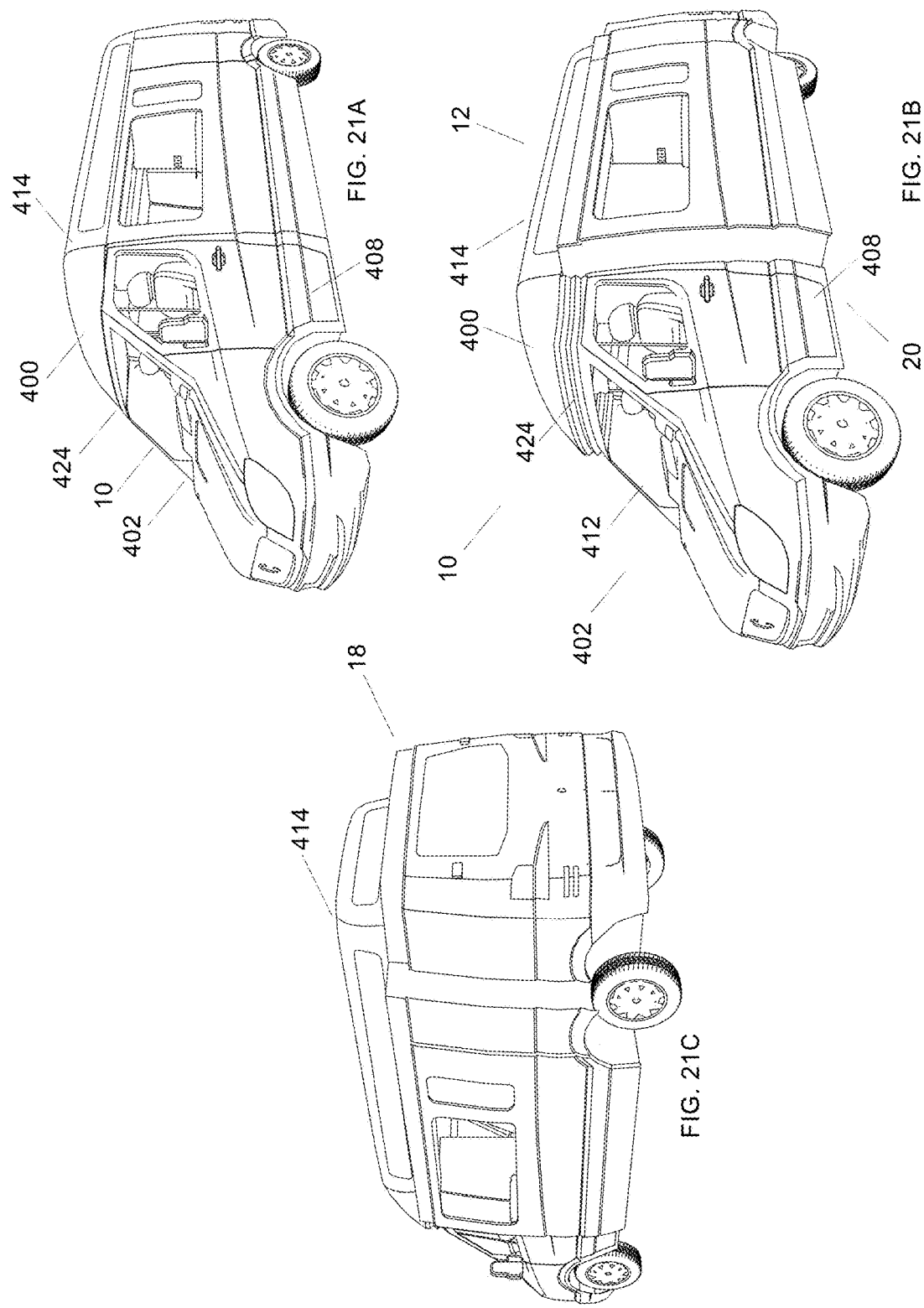

SLEEPING COMPARTMENT FOR A RECREATIONAL VEHICLE

TECHNICAL FIELD

The present relates to recreational vehicles having temporary habitation units, and more particularly to an expandable temporary habitation unit with an enlarged usable living area having a separate sleeping compartment.

BACKGROUND

Recreational vehicles (RVs) including motor homes, travel trailers and caravans are now commonplace. They provide families with an opportunity to drive to locations of interest and have immediate access to living quarters upon arrival. The flexibility provided by such temporary living spaces are such that the users do not pay hotel fees, they are close to nature, and leave little in way of carbon footprint. While this seemingly simple way of living has many advantages, RVs and caravans have a number of significant drawbacks, which can hamper the full enjoyment of their use. The most common problem is providing a living space that is both functional and sufficiently large so that the users do not feel cramped whilst inside.

To address these problems, a number of RVs have been designed, which provide extensible slide-out units for increasing the vehicle's living space. This slide-out unit may be extended for use when the vehicle is parked and is retracted in a telescoping manner when the vehicle is to be moved. Examples of such designs are given below.

U.S. Pat. No. 7,802,834 for "Multiple slide-out room for a recreational vehicle" to Cadena et al on Sep. 28, 2010 discloses multiple slide-out system for a recreational vehicle or the like includes a first slide-out section having a first floor, a first carriage abutting and affixed to the first floor, a first driven track affixed to the underside of the first carriage, and a first drive motor anchored to the floor of the vehicle to drive the first slide-out section relative to the vehicle. A second slide-out section which slides within the first slide-out section includes a second floor, a second carriage abutting and affixed to the second floor, a second driven track affixed to the underside of the second carriage, and a second drive motor anchored to top side of the first carriage to drive the second slide-out section relative to the first slide-out section. The driven tracks do not extend underneath the portions of the slide-out section floors that will be visible from the outside of the vehicle when the system is in its extended position, thereby presenting a clean and generally smooth appearance when viewed from the outside.

U.S. Pat. No. 7,226,116 for "Recreational vehicle full wall slide-out" to Jones on Jun. 5, 2007 discloses a mobile recreational vehicle, which includes a body enclosing a living area designed to serve as self-contained living quarters during recreational travel. The body is supported on at least one pair of wheels (and often two or more pairs). The vehicle includes a ceiling assembly, a floor assembly; and an elongated and adjustable ceiling support extending between the ceiling assembly and the floor assembly wherein the height of the support can be adjusted during installation. In some instances, the vehicle has a shortened full length slide-out to allow for additional sidewall ceiling support, and in some instances has a slide-out opening that has cambered upper edges to minimize sagging the opening.

U.S. Pat. No. 6,527,324 for "Adjustable slide-out room for mobile living quarters" to McManus et el on Mar. 4, 2003 discloses a recreational vehicle, which includes structure defining side walls of a main living unit mounted on a frame and a slide-out room which extends and retracts through an aperture in one of the side walls. Adjustments are provided to adjust the angular orientation of the slide-out room without respect to the sidewall of the main living unit, to adjust the vertical position of the slide-out room in the extended position and to adjust the tilt of the slide-out room. Further adjustments are also provided to adjust the position of the back wall of the slide-out room in the retracted position to assure that trim and decals applied to the side wall of the unit and extending over the back wall of the slide-out room are properly aligned.

U.S. Pat. No. 5,491,933 for "Flat floor slide out apparatus for expandable rooms" to Miller et al on Feb. 20, 1996 discloses an expandable room structure, which has relatively movable room portions supported by telescopically sliding tubes, at least one of those tubes being movable also laterally to pivot as the room portion floors slide into the same horizontal plane when the room structure is moving into expanded positions. In retracted positions the room portion floors are vertically spaced to permit one room portion to nest within the other. A rack and pinion drive arrangement is provided to cause relative movement between the tubes. Lateral movement of one of the tubes is permitted by engagement with an inclined surface extending out of the other tube such that the laterally moving tube pivots about the pinion. A ramp surface is formed on the abutting edge of the floor of one room portion, and the abutting edge of the floor of the other room portion moves up and down that ramp portion when transitioning between expanded and retracted positions. When moving to expanded positions, such movement down the ramp occurs prior to pivoting of the sliding tube(s), such that end wall weather sealing is pivotally clamped without vertical sliding.

U.S. Pat. No. 5,248,180 for "Expandable enclosure" to Hussaini on Sep. 28, 1993 discloses an expandable enclosure suitable for a cargo vehicle, a passer vehicle, a stationary shelter or a stationary storage facility. An expansion unit is outwardly translatable from the enclosure by racks fixed to the unit. The expansion unit has first uprights fixed between the racks and second uprights fixed to the enclosure but having a sliding connection with the racks. Third uprights are disposed between the first and second uprights and are slidingly connected between the racks. The expansion unit may be mounted to the enclosure by the gears alone or may additionally be supported by a cantilever beam when the expansion unit is being deployed.

U.S. Pat. No. 4,222,604 for "Caravan or campervan construction" to Human on Sep. 16, 1980 discloses a transportable housing structure comprising a cabin unit having access openings and a foldable/unfoldable annex attachment at the rear or trailing end and capable of forming a caravan-body or campervan-body or similar vehicular body is provided, the annex attachment being formed by a pair of rigid panel members hinged to the top and bottom of the cabin unit respectively for movement from a folded, relatively vertical, non-use position to an unfolded, relatively horizontal, in-use position; a flexible cover member extending around the peripheries of the panel members top to bottom from the rear of the cabin unit; a pair of hinged posts at the outer corners of the panel members to depend from the top panel member and support the unfolded top panel member on the unfolded bottom panel member; and a pair of hinged legs to depend from the outer corners of the bottom panel member and support the unfolded annex attachment on the ground.

Disadvantageously, some of the designs described above include an extension/retraction system that relies on screws or a pinion to provide telescoping movement of the slide-out unit relative to the vehicle. If screws are used, they must be short for practical reasons because longer screws deform so that the axis of the screw is not linear. If pinions are used, they too must be short. Since the amplitude of movement of the slide-out room or compartment can be no greater than the length of the screw or pinion, the amplitude of sliding movement, and hence the amount of additional space gained by the slide-out compartment, is limited.

Other types of slide-out units use an endless cable which passes over a pair of pulleys which is supported by a main part of the mobile home and another pair of pulleys mounted on sidewalls of an extension part of the mobile home cause the extension part to reciprocate. Another slide-out installation shows an expanding unit, which includes a rotatable shaft and two types of cables wound around the shaft. Rotation of the shaft in one direction causes one type of cable to wind as the other type unwinds, causing a second module to reciprocate in one direction relative to first module. Rotation of the shaft in the opposite direction causes the second module to move in the opposite direction.

A major problem that hampers the use of slide-out units is that of cantilevering as the unit extends. The outer end of the extended slide-out unit tends to tip downwardly, which places weight on the slide-out unit's operating mechanism. The cantilevered slide-out unit also tends to cause looseness at the top, which in turn causes tightness at the bottom. This puts weight on the slide-out mechanism, which in impairs slidability and causes leakage around the joints.

Another problem with slide-out units is that they require significant modification of the vehicle's sub frame. This makes designs of this type prohibitively expensive to manufacture. Furthermore, the complexity of the above designs makes their maintenance difficult Thus, there is a need for an improved temporary habitation unit, which provides a larger living space.

BRIEF SUMMARY

Generally speaking, a Recreational Vehicle (RV) provides comfortable sleeping areas for three to four people, depending on the size of the RV. I have now designed a novel and unobvious expandable habitation unit for use with an RV in which I have converted the unused space above the driver's cabin into a sleeping berth. To achieve this, I have designed a roof in which the front part of the roof sidewall flares out so as to be flush with the driver's windshield to preserve the aerodynamic qualities of the RV when the roof is in the closed configuration. I have included an accordion-like seal at the junction between the front sidewall and the top of the cabin above the windshield and doors. When the roof is moved upwardly, the seal expands to allow a person to then have access to the sleeping berth. In addition to this, I have also designed a temporary, expandable living unit that substantially reduces, or essentially eliminates, the problems described above in the previous designs. My unit addresses the problems by using a novel and non-obvious frame piston and guide arrangement, which when in operation provide a user with a living space that is substantially larger than those described above because a roof, a rear module and two side modules are all fully deployed so that their individual habitation area and volumes are used in their totality. In other words, the entire exterior shell of the habitation unit is deployed to create additional living space. The piston, guide and frame arrangement allows the floors of individual living modules to slide over the main floor, and when locked in place, address the problems of cantilevering which plagued many of the known designs. Advantageously, my unit can be retrofitted onto an existing vehicle subframe or it can be used as a stand-alone unit that can be hitched to the back of another vehicle.

Accordingly, in one aspect there is provided a sleeping compartment for a recreational vehicle having a cabin with a ceiling, a rear wall, two doors, seats, a windshield, and an expandable habitation unit located behind the rear wall, the sleeping compartment comprising:

a roof sized and shaped to cover the expandable habitation unit and the cabin, the roof having a front roof portion and a rear roof portion, the roof being actuatable between a closed configuration and an open configuration; and a sleeping berth separate from and independent to the expandable habitation unit, the sleeping berth having a sleeping surface located on top of the ceiling, the front roof portion being moveably connected to the cabin above the windshield and the doors to permit movement of the roof between the open and closed configuration.

In one example, the front roof portion is sealingly connected to the cabin. An expandable connector is sealingly connected to the cabin. The expandable connector is an accordion-like connector. In the open configuration the accordion-like connector is disposed generally orthogonal to the sleeping surface.

In one example, in the open configuration an access opening is located rearwardly of the sleeping berth, the access opening being sized to permit a user to move into and out of the sleeping berth, the access opening separates the expandable habitation unit from the sleeping berth.

In one example, in which in the closed configuration, the front roof portion is disposed coplanar with the windshield to create an aerodynamic surface.

In another example, the habitation unit includes two side modules, a rear module, and a main frame, the side modules and the roof module being moveable and overlapping along respective restrictive paths of travel; the roof being connected to the main frame to permit movement along a roof restricted path of travel such that in the closed configuration, the roof, the modules and the sleeping berth define a first habitation volume, the roof being moveable along the roof restricted path of travel orthogonally relative to the respective restricted paths of travel of the overlapping modules so as to vary the size of the first habitation volume.

In another example, the main frame, the rear module, the first side module, the second side module and the roof are each interconnected to at least two actuators such that in response to a first user command, the actuators moves the modules and the roof away from each other along the respective restricted paths of travel from a default closed habitation configuration to a first open configuration. The main frame, the rear module, the first side module, the second side module and the roof are each interconnected to at least two actuators such that in response to a second user command, the actuators moves the modules and the roof away from each other along the respective restricted paths of travel from the first open configuration to the default closed configuration.

In one example, the main frame is a cuboid frame. The cuboid frame includes: a front frame portion having mounted thereon two lower actuators and two upper actuators, the two upper actuators being disposed generally orthogonal to the two lower actuators; and a rear frame portion having mounted thereon two lower actuators and two upper actuators, the two upper actuators being disposed orthogonal to the two lower actuators. The two front and rear lower actuators are connected to the first and second side modules. The front roof portion is angled away from the two upper actuators. The actuators are hydraulic pistons.

Accordingly, in another aspect there is provided a recreational vehicle having a cabin with a ceiling, a rear wall, two doors, seats, and a windshield, the recreational vehicle comprising:

a main frame mounted on a vehicle subframe;

a main floor;

an expandable habitation unit having two side modules, and a rear module, each module overlapping and in communication with the main floor to permit movement thereover along respective restricted paths of travel;

a roof sized and shaped to cover the expandable habitation unit and the cabin, the roof having a front roof portion and a rear roof portion, the roof being actuatable between a closed configuration and an open configuration; and a sleeping berth separate from and independent to the expandable habitation unit, the sleeping berth having a sleeping surface located on top of the ceiling, the front roof portion being moveably connected to the cabin above windshield and the doors to permit movement of the roof between the open and closed configuration.

In one example, the front roof portion is sealingly connected to the cabin above the windshield and the doors.

In one example, an expandable connector is sealingly connected to the cabin above the windshield and the doors. The expandable connector is an accordion-like connector.

In another example, in the open configuration the accordion-like connector is disposed generally orthogonal to the sleeping surface.

Accordingly, in one aspect there is provided an expandable habitation unit comprising:

a main frame;

a main floor having an exposed habitation area;

a rear module having a rear module floor located over a rear portion of the main floor, the rear module floor being connected to the main frame to permit movement along a first restricted path of travel over the rear portion of the main floor;

a first side module having a first side module floor located over a first side portion of the main floor, the first side module floor being connected to the main frame to permit movement along a second restricted path of travel over the first side portion of the main floor; and a second side module having a second side module floor located over a second side portion of the main floor, the second side module floor being connected to the main frame to permit movement along a third restricted path of travel over the second side portion of the main floor, the rear module, the first side module and the second side module being moveable and overlapping along their respective restricted paths of travel so as to vary the size of the exposed habitation area.

In one example, the unit further includes: a roof connected to the main frame to permit movement along a fourth restricted path of travel, the roof being sized and shaped to cover and overlap the rear module, the first side module, the second side module and the main floor; the roof, the rear module, the first side module and the second side module defining a habitation volume; the roof being moveable along the fourth restricted path of travel orthogonally relative to the respective restricted paths of travel of the rear module, the first side module and the second side module so as to vary the size of the habitation volume. In a default closed configuration, the roof, the rear module, the first side module and the second side module overlap each other being located towards each other and define a first habitation volume. In a first open configuration, the roof, the rear module, the first side module and the second side module are located away from each other and define a second habitation volume, the second habitation volume being larger than the first habitation volume, and almost doubled in volume.

In another example, the rear module includes: a rear module lower frame supported on two rear module guide rails located below the main floor level, the rear module being guided by the two rear module guide rails along the first restricted path of travel, the rear module lower frame being in communication with two rear module actuators for pushing the rear module lower frame relative to the first and second side modules. The rear module further includes a stepped rear module roof.

In another example, the first side module includes a first side module lower frame supported on two guide rails located below the main floor level, the first side module being guided by the two guide rails along the second restricted path of travel; and the second side module includes a second side module lower frame supported on two guide rails located below the main floor level, the second side module being guided by the two guide rails along the third restricted path of travel, each of the first and second side module lower frames being in communication with two side module actuators for pushing the first and second side modules relative to each other. The first side module further includes a first side module stepped roof, and the second side module further includes a second side module stepped roof.

In another example, the roof is in communication with four roof actuators for pushing the roof along the fourth restricted path of travel relative to the rear module, the first side module and the second side module.

In yet another example, the roof includes a peripheral sidewall which depends downwardly therefrom and overlaps the rear module, the first and second side modules.

In one example, the unit includes: a roof having a peripheral sidewall which depends downwardly therefrom; a rear module having a rear module roof with first and second steps; a first side module having a first side module roof with first and second side module steps; a second side module having a second side module roof with third and fourth side module steps, the roof, the rear module, the first side module and the second side module being located such that in a default closed configuration, the peripheral sidewall of the roof sealingly abuts the first step of the rear module, the first step of the first side module and the third step of the second side module, and sealingly abuts a front portion of the main frame. In a first open configuration the peripheral sidewall of the roof sealingly abuts the second step of the rear module, the second step of the first side module and the fourth step of the second side module, and sealingly abuts the front portion of the main frame. An actuatable retractable locking pin locks the roof to the rear module, the first side module and the second side module in either the open configuration or the default configuration.

In another example, a plurality of rollers are located between the rear module floor, the first side module floor and the second side module floor and the main floor to permit movement therealong.

In another example, a plurality of gaskets seal the peripheral sidewall to the rear module, the first side module and the second side module.

In one example the main frame, the rear module, the first side module, the second side module and the roof are each interconnected to at least two actuators such that in response to a first user command, the actuators moves the modules and the roof away from each other along the respective restricted paths of travel from a default closed habitation configuration to a first open configuration.

In another example, the main frame, the rear module, the first side module, the second side module and the roof are each interconnected to at least two actuators such that in response to a second user command, the actuators moves the modules and the roof away from each other along the respective restricted paths of travel from the first open configuration to a second open configuration.

In one example, the main frame is a cuboid frame. The cuboid frame includes: a front frame portion having mounted thereon two lower actuators and two upper actuators, the two upper actuators being disposed orthogonal to the two lower actuators; and a rear portion frame portion having mounted thereon two lower actuators and two upper actuators, the two upper actuators being disposed orthogonal to the two lower actuators. The two front and rear lower actuators are connected to the first and second side modules.

In one example, the unit is free-standing.

In another example, the unit is mounted on a vehicle.

Accordingly, in another aspect there is provided a recreational vehicle comprising:
a main frame mounted on a vehicle subframe;
a main floor;
a rear module having a rear module floor located over a rear portion of the main floor, the rear module floor being connected to the main frame to permit movement along a first restricted path of travel over the rear portion of the main floor;
a first side module having a first side module floor located over a first side portion of the main floor, the first side module floor being connected to the main frame to permit movement along a second restricted path of travel over the first side portion of the main floor;
a second side module having a second side module floor located over a second side portion of the main floor, the second side module floor being connected to the main frame to permit movement along a third restricted path of travel over the second side portion of the main floor;
a roof connected to the main frame to permit movement along a fourth restricted path of travel, the roof being sized and shaped to cover and overlap the rear module, the first side module, the second side module and the main floor, the roof, the rear module, the first side module and the second side module defining a habitation volume,
the roof, the rear module, the first side module and the second side module being moveable along their respective restricted paths of travel so as to vary the size of the habitation volume.

In one example, the main frame, the rear module, the first side module, the second side module and the roof are each interconnected to at least two actuators such that in response to a first user command, the actuators move the modules and the roof away from each other along the respective restricted paths of travel from a default overlapped closed habitation configuration to a first open configuration. The main frame, the rear module, the first side module, the second side module and the roof are each interconnected to at least two actuators such that in response to a second user command, the actuators moves the modules and the roof towards each other along the respective restricted paths of travel from the first open configuration to the default overlapped closed configuration.

Accordingly, in another aspect, there is provided a stand-alone expandable habitation unit comprising:
a main frame mounted on a subframe;
a main floor;
a sidewall connected to the main frame;
a rear module having a rear module floor located over a rear portion of the main floor, the rear module floor being connected to the main frame to permit movement along a first restricted path of travel over the rear portion of the main floor;
a first side module having a first side module floor located over a first side portion of the main floor, the first side module floor being connected to the main frame to permit movement along a second restricted path of travel over the first side portion of the main floor;
a second side module having a second side module floor located over a second side portion of the main floor, the second side module floor being connected to the main frame to permit movement along a third restricted path of travel over the second side portion of the main floor;
a front module having a front module floor located over a front portion of the main floor, the front module being connected to the main frame to permit movement along a fourth restricted path of travel over the front portion of the main floor;
a roof connected to the main frame to permit movement along a fifth restricted path of travel, the roof being sized and shaped to cover and overlap the rear module, the first side module, the second side module, the front module, the main floor and the sidewall, the roof, the rear module, the first side module, the second side module, the front module and the sidewall defining a habitation volume,
the roof, the rear module, the front module, the first side module and the second side module being moveable along their respective restricted paths of travel so as to vary the size of the habitation volume.

In one example, the main frame, the rear module, the first side module, the second side module, the front module, the roof and the sidewall are each interconnected to at least two actuators such that in response to a first user command, the actuators move the modules and the roof away from each other along the respective restricted paths of travel from a default overlapped closed habitation configuration to a first open configuration. The main frame, the rear module, the first side module, the second side module, the front module, the roof and the sidewall are each interconnected to at least two actuators such that in response to a second user command, the actuators moves the modules and the roof towards each other along the respective restricted paths of travel from the first open configuration to the default overlapped closed configuration.

In one example, a hitch is connected to the subframe to permit connection of the unit to a vehicle.

In another example, in any one of the above units, a stepped stabilizing member extends upwardly from each of the stepped first and second side module roofs. Each stepped stabilizing member abuttingly engages the main frame in the open configuration.

BRIEF DESCRIPTION OF THE DRAWINGS

These and other features of that described herein will become more apparent from the following description in which reference is made to the appended drawings wherein:

FIG. 1 are perspective views of a recreational vehicle with an expandable habitation unit in which FIG. 1A is a front perspective view of the vehicle in a closed default configuration; FIG. 1B is a front perspective view of the vehicle in an open configuration showing a roof and a side module deployed; and FIG. 1C is a rear perspective view of the vehicle in an open configuration showing a roof, a side module and a rear module deployed;

FIG. 3 is a front view of a recreational vehicle with an expandable habitation unit in a closed configuration (left hand drawing), and in an open configuration (right hand drawing);

FIG. 19A through FIG. 19D is a diagrammatic representation of an opening sequence of the habitation unit in which FIG. 19A is a perspective view of the unit showing the roof opening in the direction of the arrows; FIG. 19B is a perspective view of the unit showing the rear module opening in the direction of the arrows; FIG. 19C is a perspective view of the unit showing the two side modules opening in the direction of the arrows; and FIG. 19D is a perspective view of the unit showing the roof moving down to lock the unit in the direction of the arrows;

FIG. 21 are perspective views of a recreational vehicle with an expandable habitation unit in which FIG. 21A is a front perspective view of the vehicle in a closed default configuration showing a collapsed accordion-like connector; FIG. 21B is a front perspective view of the vehicle in an open configuration showing a roof and a side module deployed and showing the accordion-like connector fully extended; and FIG. 21C is a rear perspective view of the vehicle in an open configuration showing a roof, a side module and a rear module deployed;

DETAILED DESCRIPTION

Definitions

Figure 1:
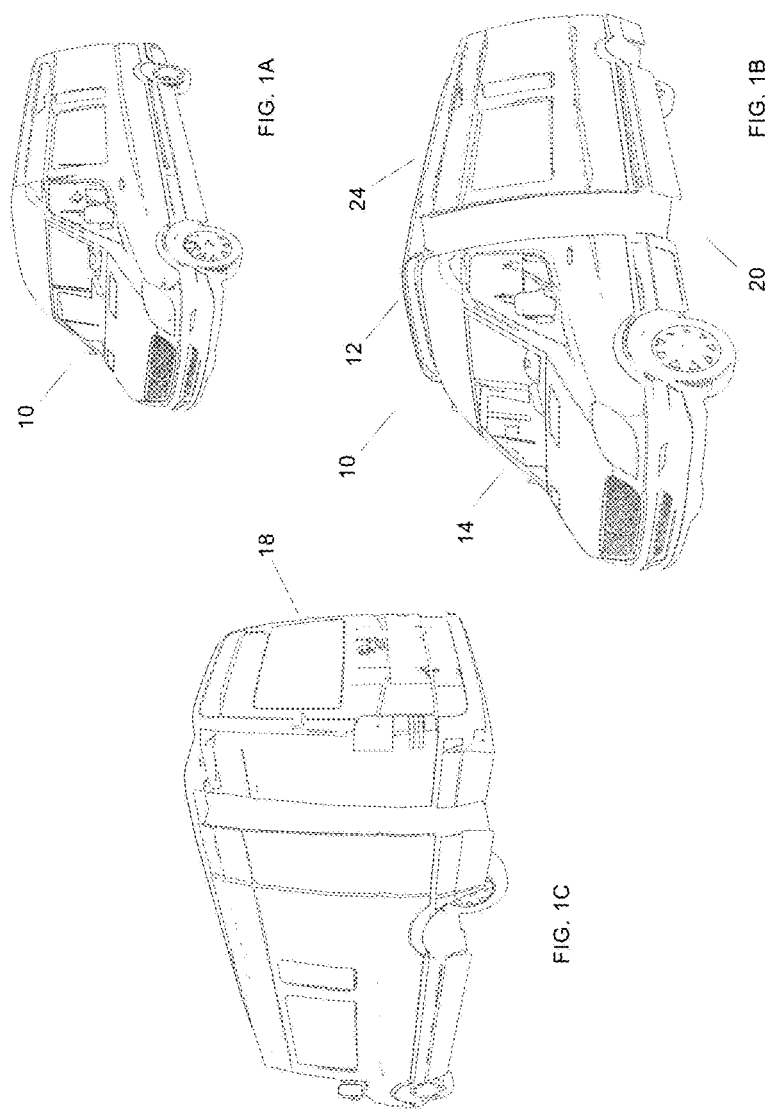
Figure 2:
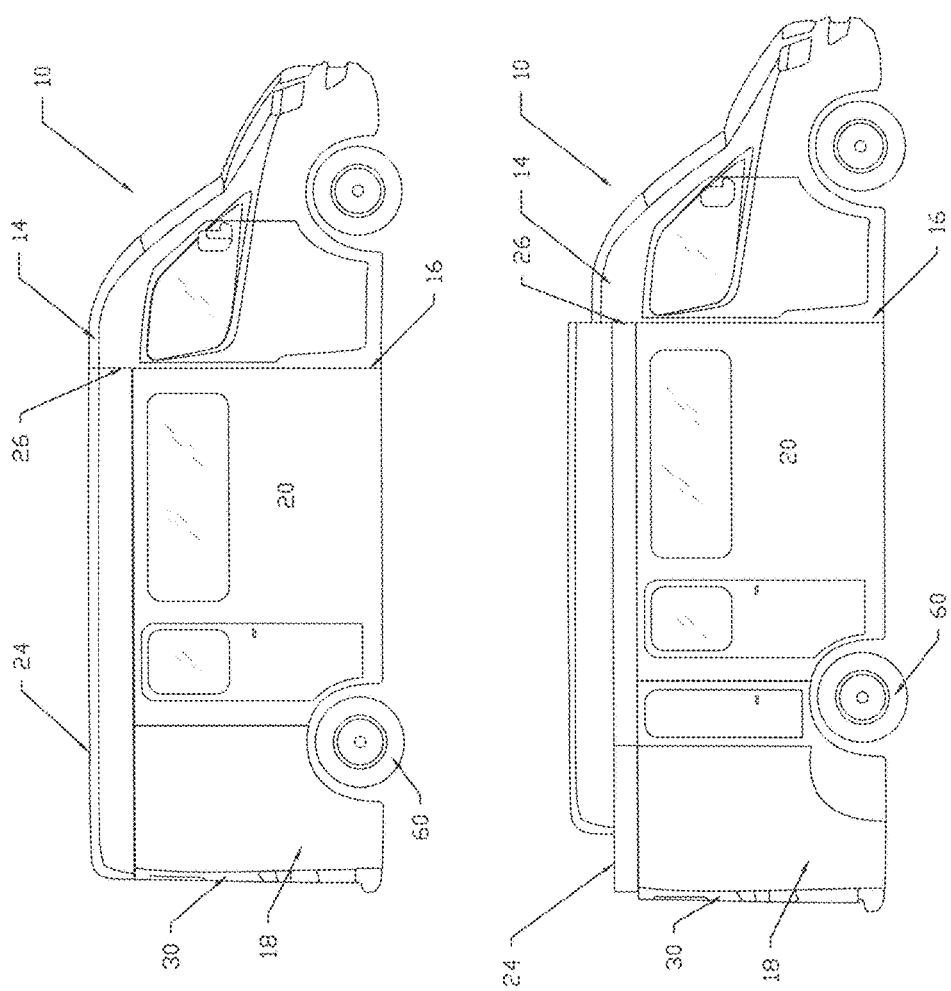
FIG. 2 is a left hand side view of a recreational vehicle with an expandable habitation unit in a closed configuration (upper drawing), and the expandable habitation unit showing a roof and a rear module in an open configuration (lower drawing)
Figure 4:
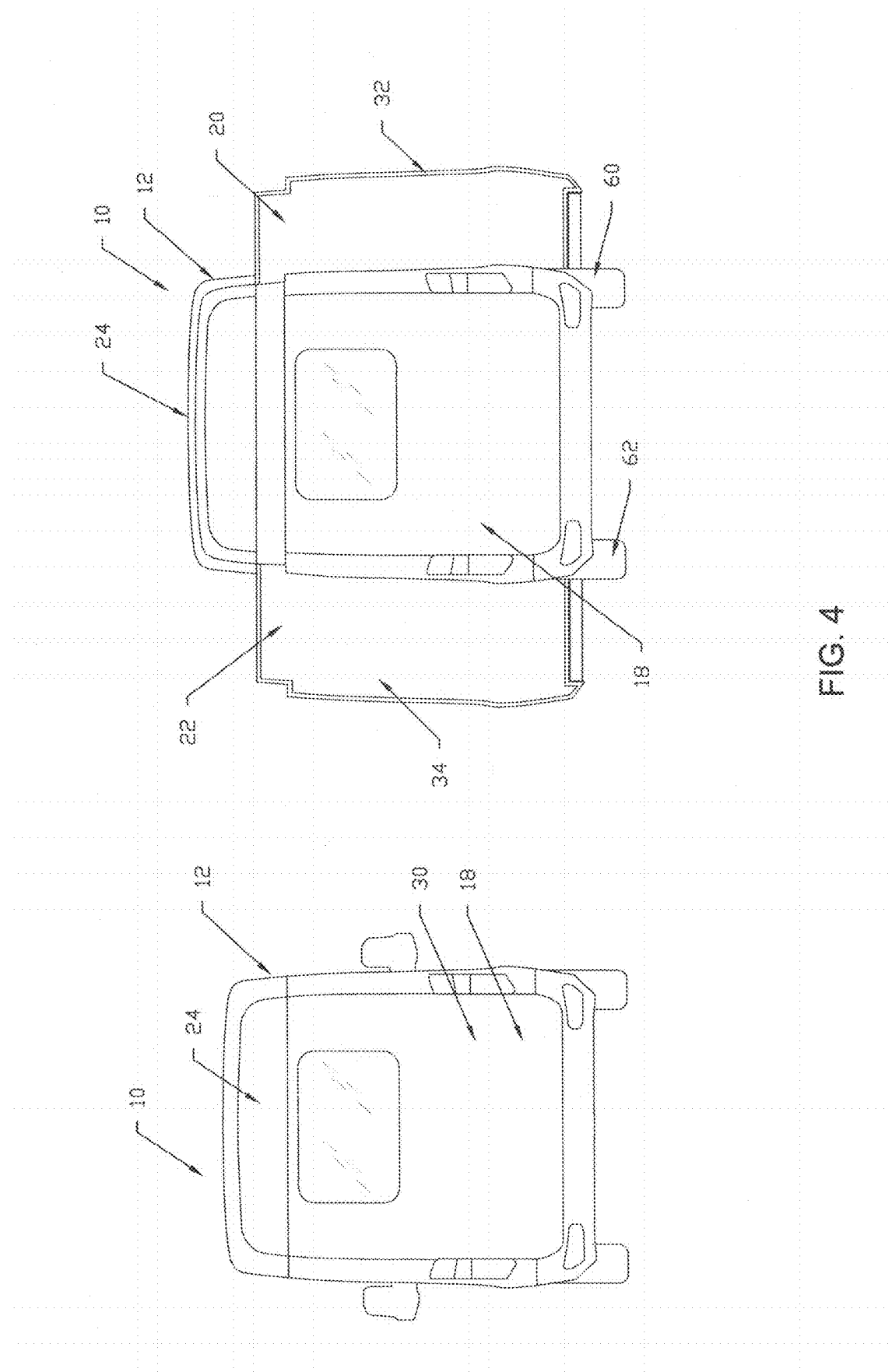
FIG. 4 is a rear view of a recreational vehicle with an expandable habitation unit in a closed configuration (left hand drawing), and in an open configuration (right hand drawing)

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

Referring now to FIGS. 1 through 4, there is illustrated a recreational vehicle (RV) 10 with an expandable habitation unit 12 extending rearwardly from an RV cabin 14. The cabin 14 includes a rearwardly facing wall 16 and a control panel (not shown), which is located inside the cabin 14. The control panel permits a user to operate closing and opening of the habitation unit 12 various overlapping modules. Broadly speaking, the habitation unit 12 comprises a rear module 18, a first side module 20, a second side module 22, a roof 24, a unit sidewall 26 and a main frame 28. In the example illustrated, the rear module 18 is typically a kitchen unit with a sink, cupboards and the like. The first side module 20 is typically a dining unit with an attached bathroom/shower facility. The second side module 22 is a living unit with food storage units. The rear module 18 includes a curved outer wall 30, whereas the first and second side modules 20, 22 have respectively first and second planar outer walls 32, 34. In a default configuration, the rear module 18, the first side module 20, the second side module 22 and the roof 24 of the habitation unit 12 are locked together with the roof 24 overlapping the modules 18, 20, 22 and provide the RV 10 with a streamline, aerodynamically favorable profile, which reduces gas consumption compared to conventional RVs. In the default configuration, the walls 30, 32, 34, and the roof 24 are coplanar to the cabin 14.

Figure 5:
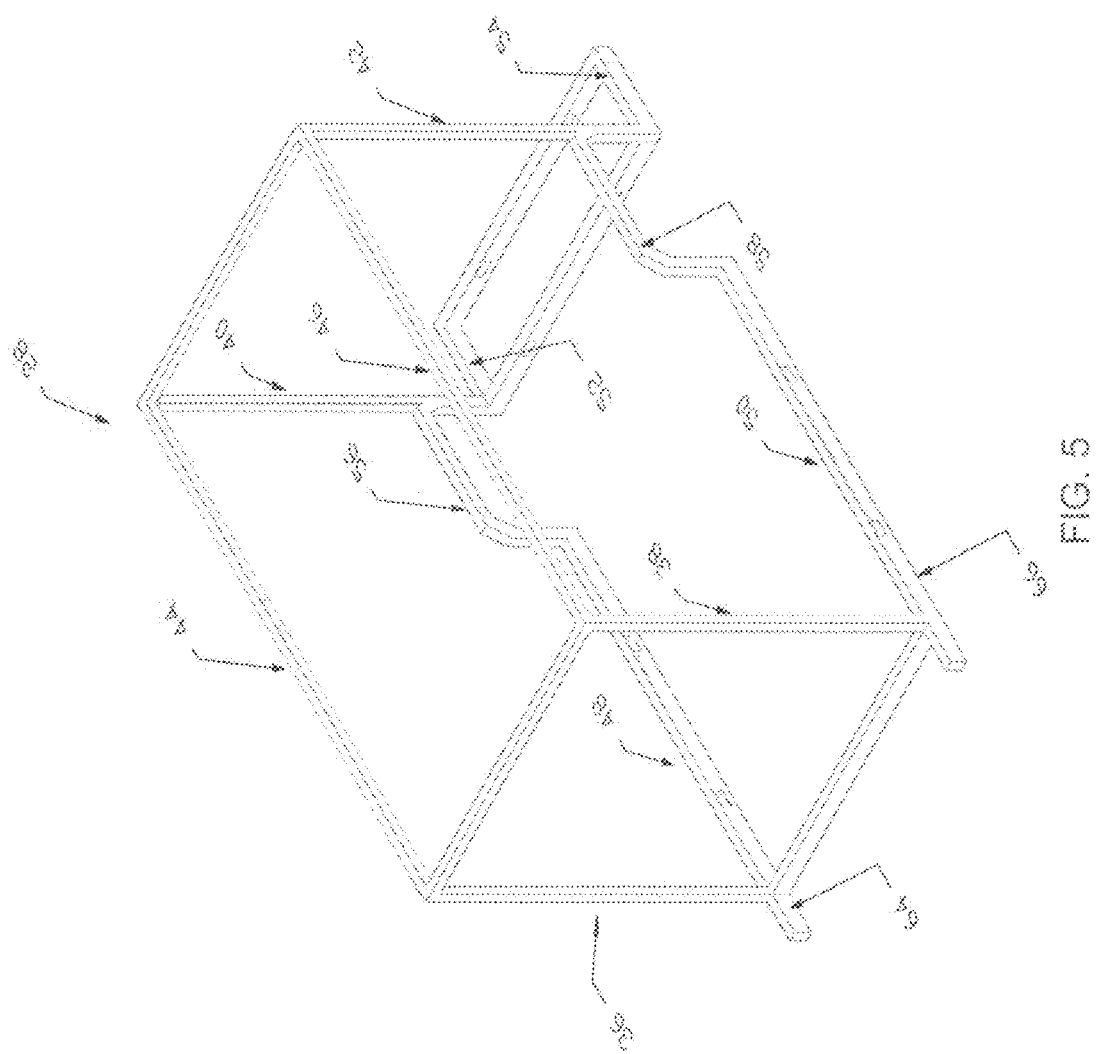
FIG. 5 is a perspective top view of a main frame of the habitation unit.

Referring now to FIG. 5, the main frame 28 is typically cuboid and includes two front, upstanding bars 36, 38, two rear upstanding bars 40, 42, two upper bars 44, 46 and two lower bars 48, 50. The two rear upstanding bars 40, 42 includes two lower, rearwardly disposed frame extensions 52, 54 to which the rear module 18 is connected. The main frame 28 also includes two arched wheel portions 56, 58 for location adjacent first and second wheels 60, 62. Two front, lower frame extensions 64, 66 anchor the main frame 28 to the cabin 14.

Figure 9:
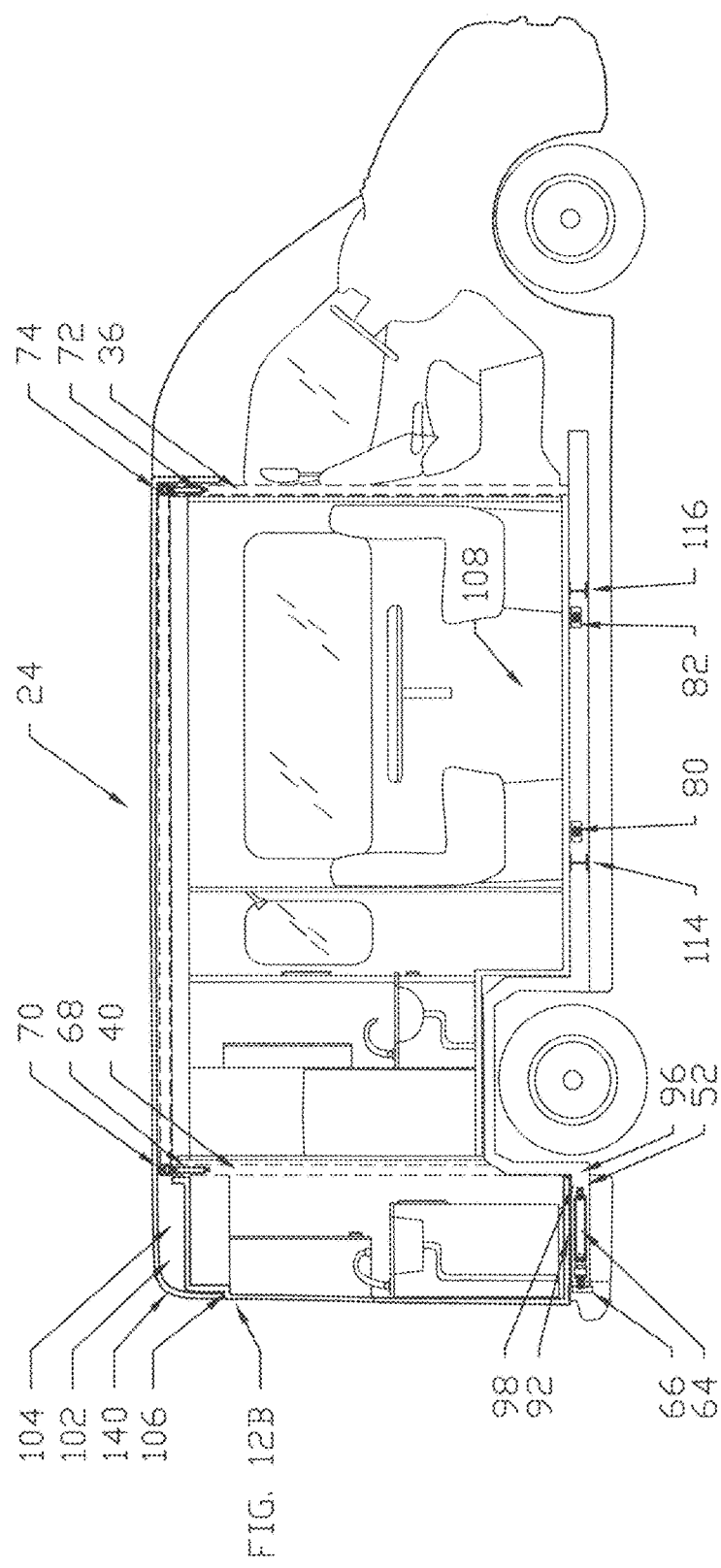
FIG. 9 is a cut away detailed side view of a habitation unit in a closed configuration showing the location of a plurality of actuators and with an arrow pointing to a view shown in FIG. 12B.
Figure 10:
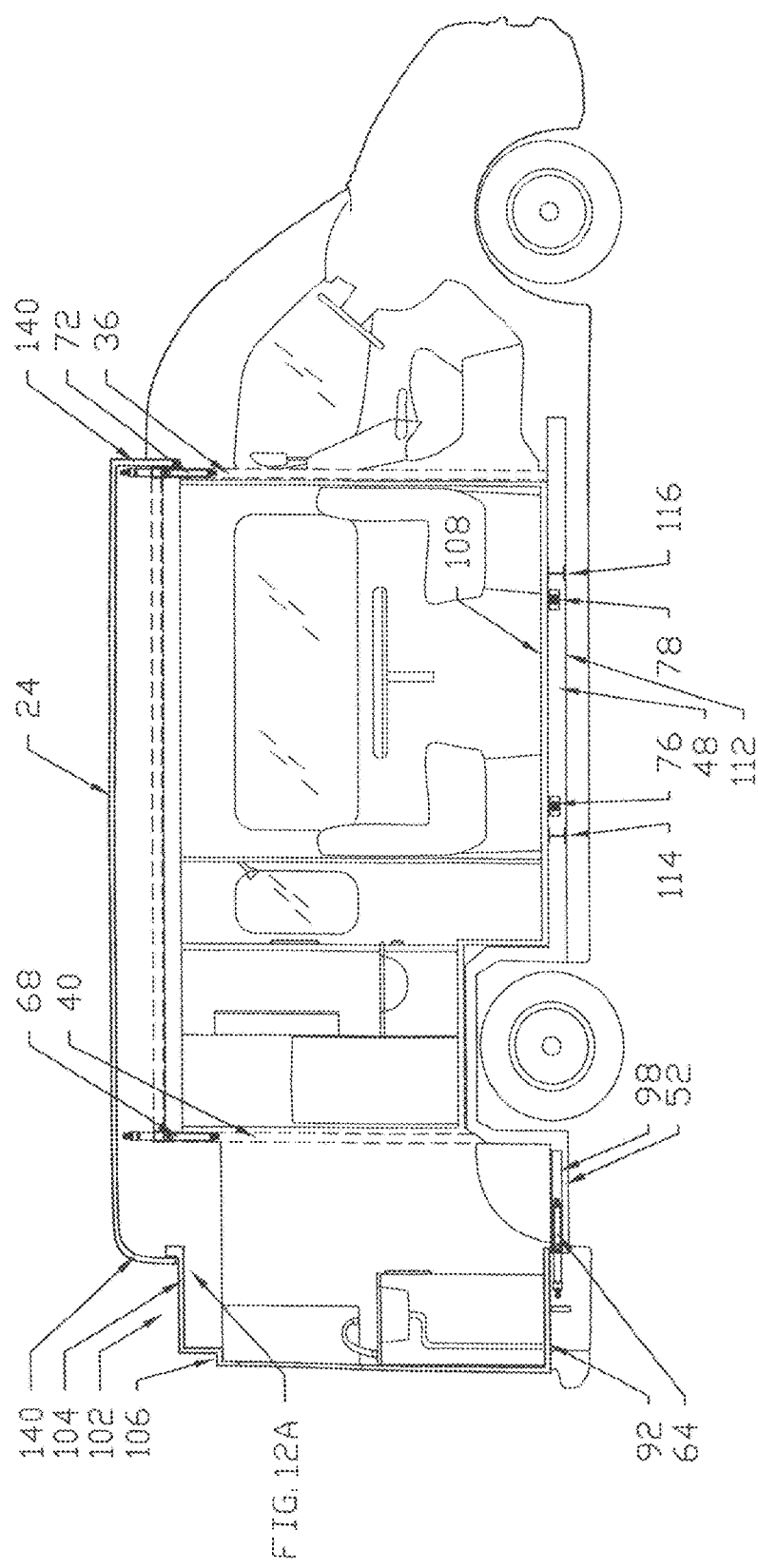
FIG. 10 is a cut away detailed side view of the habitation unit of FIG. 9 in an open configuration showing the actuators fully extended and with an arrow pointing to a view shown in FIG. 12A.
Figures 11A, 11B:
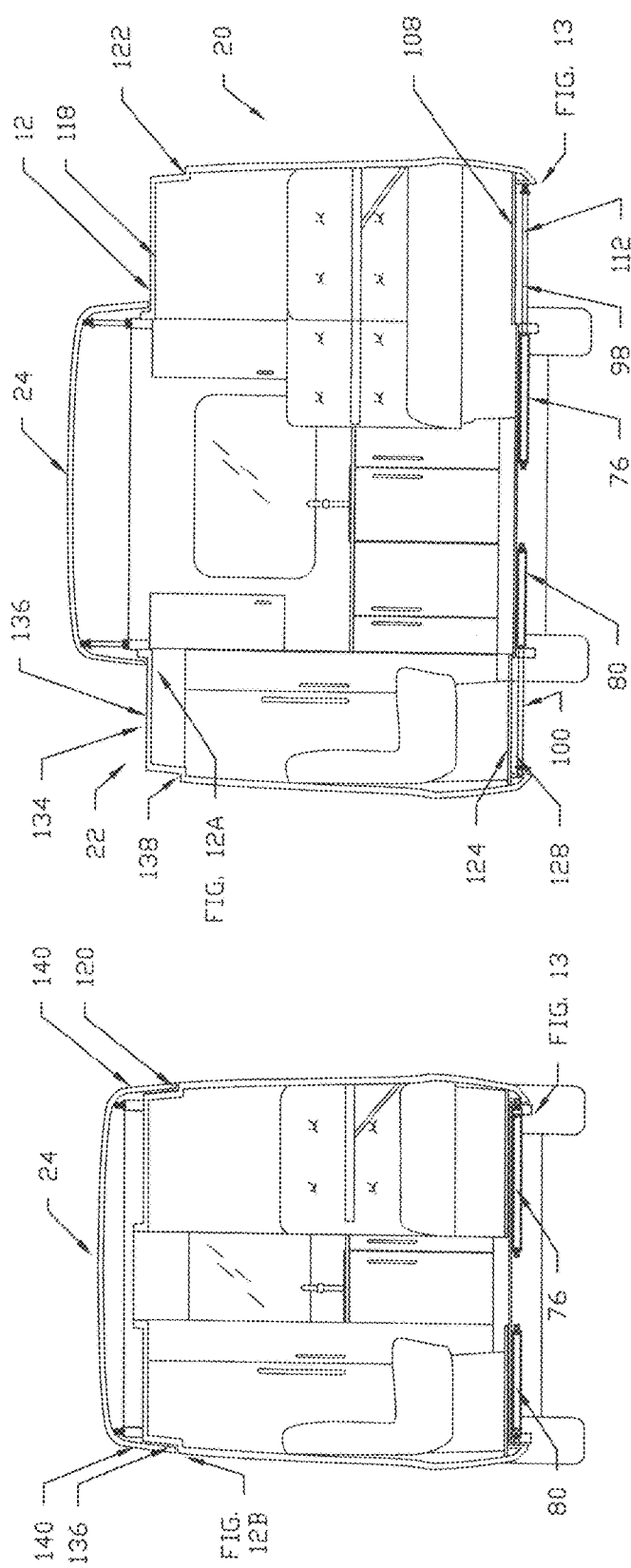
FIG. 11 is a rear cut away detailed view of a habitation unit in which FIG. 11A (left hand side) illustrates the unit in a closed configuration with arrows pointing to views shown in FIG. 12B and FIG. 13, and FIG. 11B (right hand side) illustrates the unit in an open configuration with arrows pointing to views shown in FIG. 12A and FIG. 13.

Referring now to FIGS. 9, 10 and 11, a first two spaced apart rear module actuators 64, 66 are connected to the main frame extensions 52, 54 and are disposed generally parallel to the ground. Two spaced apart roof actuators 68, 70 are connected to the two rear upstanding bars 40, 42. The two roof actuators 68, 70 are disposed generally orthogonal to the first two rear actuators 64, 66. Another two spaced apart roof actuators 72, 74 are connected to the two front, upstanding bars 36, 38. The two roof actuators 72, 74 are disposed generally parallel to the two roof actuators 68, 70, and are generally orthogonal to the first two rear actuators 64, 66. Two spaced apart side module actuators 76, 78 are connected to the lower bar 48 and another two spaced apart side module actuators 80, 82 are connected to the lower bar 50. The side module actuators 76, 78, 80, 82 are disposed generally orthogonal to the actuators 64, 66, 68, 70, 72, 74. In the examples illustrated, the actuators 64, 66, 68, 70, 72, 74, 76, 78, 80, 82 are, without limitation, hydraulic pistons which are operably connected to the control panel so that they can received commands therefrom. A person skilled in the art will recognize that different types of actuators can be used, for example, worm gears, sprocket and gear and the like.

Figure 6:
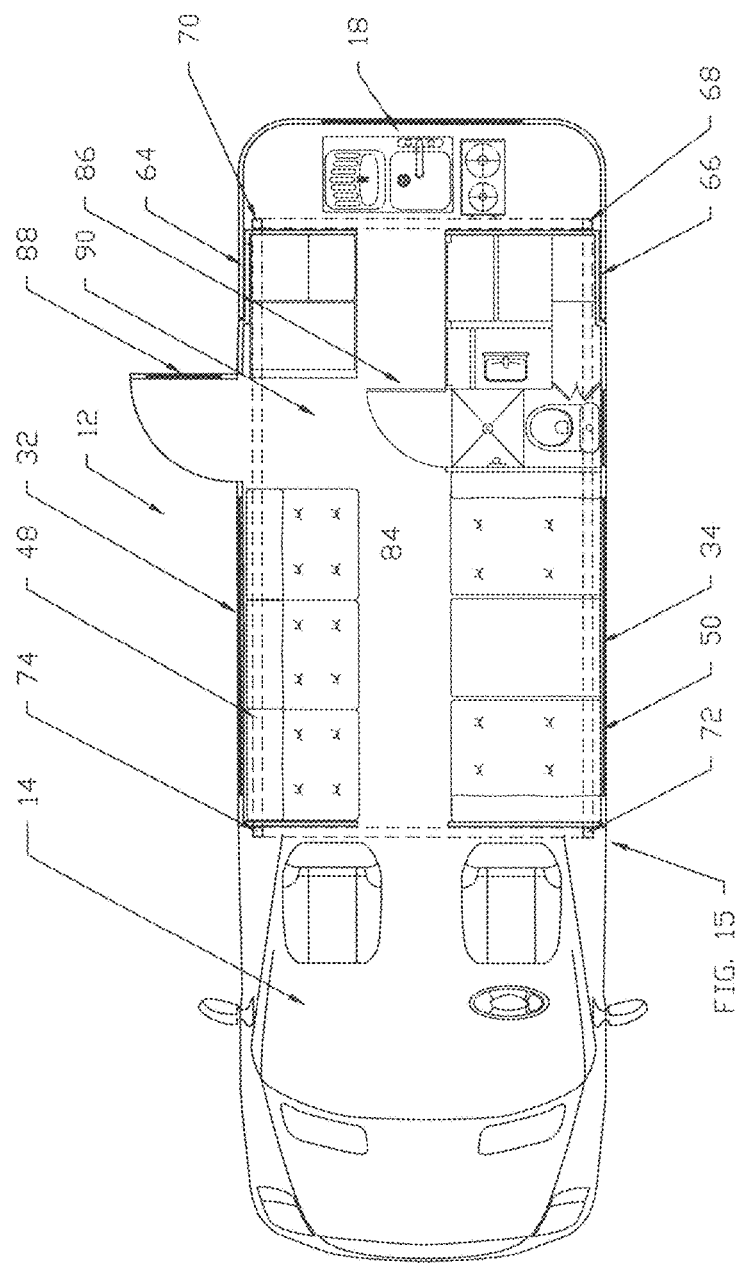
FIG. 6 is a detailed plan view of a habitation unit in a closed configuration with an arrow pointing to a view shown in FIG. 15.
Figure 7:
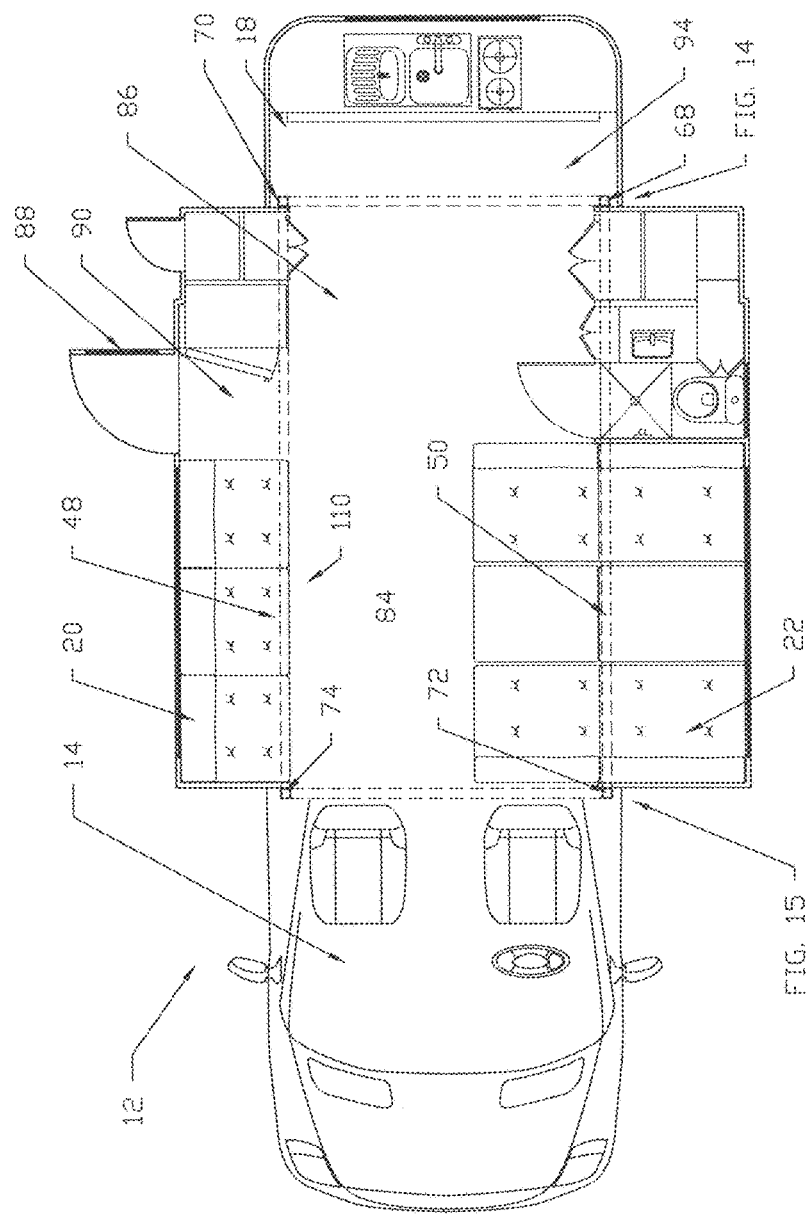
FIG. 7 is a detailed plan view of the habitation unit of FIG. 6 is a first open (day) configuration and with arrows pointing to views shown in FIG. 14 and FIG. 15.
Figure 8:
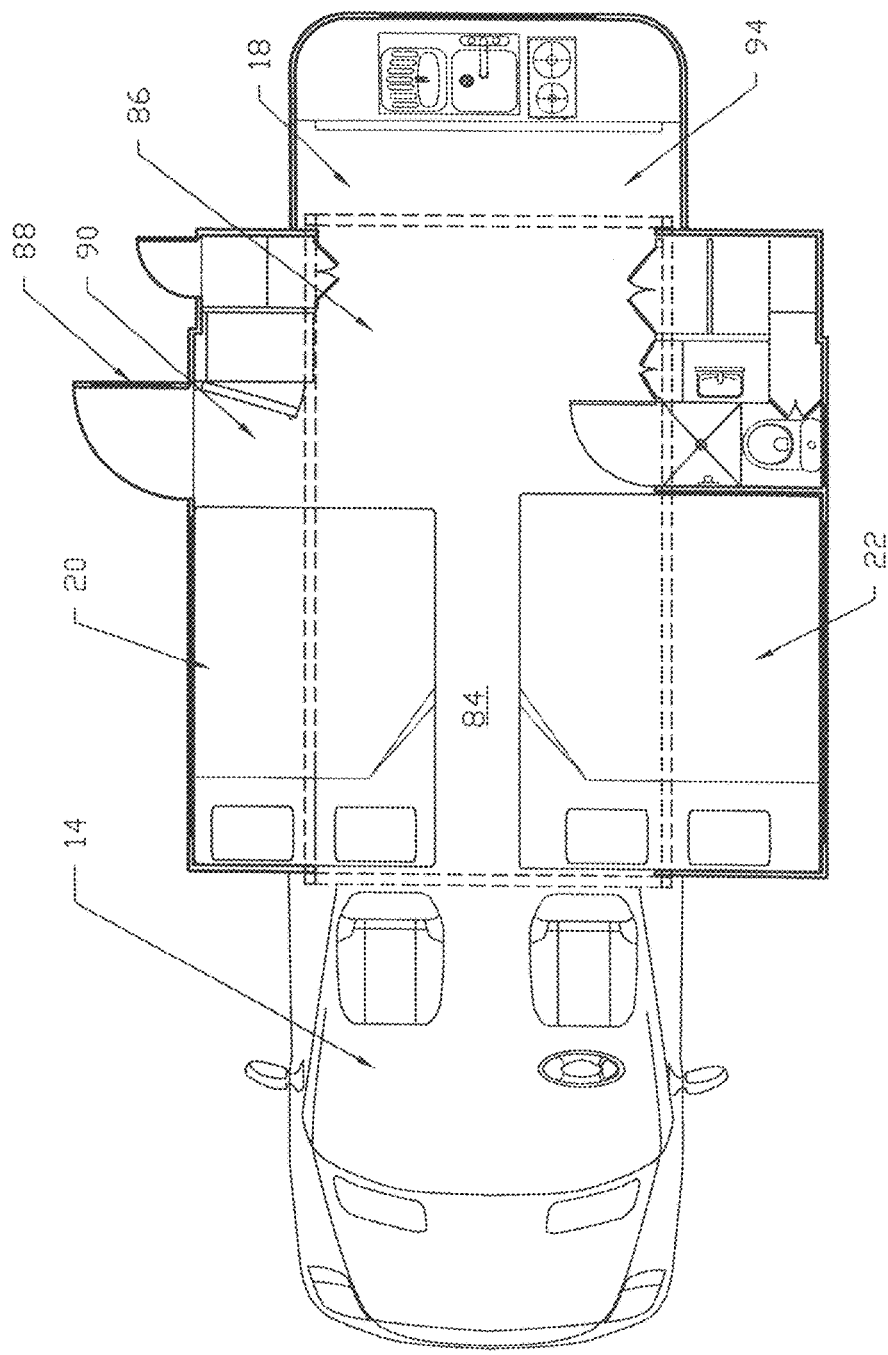
FIG. 8 is a detailed plan view of the habitation unit of FIG. 6 in a second open (night) configuration.

Referring now to FIGS. 6, 7 and 8, a main rigid floor 84 is mounted on the main frame 28 and has an exposed habitation (living) area 86. In the default configuration, the habitation area 86 is generally elongate and extends from the unit sidewall 26, which is located adjacent the rear wall 16 of the cabin 14, to the rear module 18. In the example illustrated, a door 88 and an adjacent threshold area 90 permits access to the unit 12 from outside the RV 10.

Referring now to FIGS. 6 through 11, the rear module 18 includes a rear module floor 92, which is located over a rear portion 94 of the main floor 84. The rear module floor 92 is connected to the main frame 28 to permit movement along a first restricted path of travel over the rear portion 94 of the main floor 84 in an overlapping manner. The rear module 18 also includes a rear module lower frame 96, which is part of the main frame 28 supported on two rear module guide rails 98, 100 located below the main floor 84 level. The rear module 14 is guided by the two rear module guide rails 98, 100 along the first restricted path of travel by the rear module actuators 64, 66. The rear module lower frame 96 is in communication with two rear module actuators 64, 66 to push and pull the rear module lower frame 96 relative to the first and second side modules 20, 22. The rear module 18 includes a stepped rear module roof 102 which has first and second steps 104, 106.

Referring again to FIGS. 6 through 11, the first side module 20 includes a first side module floor 108, which is located over a first side portion 110 of the main floor 84 in an overlapping manner. The first side module floor 108 is connected to the main frame 28 to permit movement along a second restricted path of travel over the first side portion 110 of the main floor 84. The first side module 20 also includes a first side module lower frame 112 supported on two first side module guide rails 114, 116 located below the main floor 84 level. The first side module 20 is guided by the two first side module guide rails 114, 116 along the second restricted path of travel by the first side module actuators 76, 78. The first side module lower frame 112 is in communication with the first side module actuators 76, 78 to push and pull the first side module lower frame 112 relative to the rear module 18 and second side module 22. The first side module 20 includes a stepped first side module roof 118 which has first and second steps 120, 122.

Referring still to FIGS. 6 through 11, the second side module 22 includes a second side module floor 124, which is located over a second side portion 126 of the main floor 84 in an overlapping manner. The second side module floor 124 is connected to the main frame 28 to permit movement along a third restricted path of travel over the second side portion 126 of the main floor 84. The second side module 22 also includes a second side module lower frame 128 supported on two second side module guide rails 130, 132 located below the main floor 84 level. The second side module 22 is guided by the two second side module guide rails 130, 132 along the third restricted path of travel by the second side module actuators 80, 82. The second side module lower frame 128 is in communication with the second side module actuators 80, 82 to push and pull the second side module lower frame 128 relative to the rear module 18 and first side module 20. The second side module 22 includes a stepped second side module roof 134 which has first and second steps 136, 138.

The rear module 18, the first side module 20 and the second side module 22 are interconnected with the actuators 64, 66, 76, 78, 80, 82 so that they can move along their respective restricted paths of travel to vary the size of the exposed habitation area 86. The size of the exposed habitation area 86 depends on whether the unit 12 is in the overlapped closed default configuration or in the open configuration. Compared to the habitation areas and volumes of currently available RV designs, the habitation unit 12 described herein advantageously provides a habitation area and volume that is substantially larger. For example, in the overlapped closed default configuration the volume is typically about 15.9 cubic meters while the open configuration, the volume increases to about 28.7 cubic meters. For the habitation unit only, this represents an increase of about 85%, which is significant. Furthermore, the lower frames of the side modules and the rear module substantially reduces, or essentially eliminates cantilevering and therefore provides living areas that are very stable and less prone to leakage.

Figure 13:
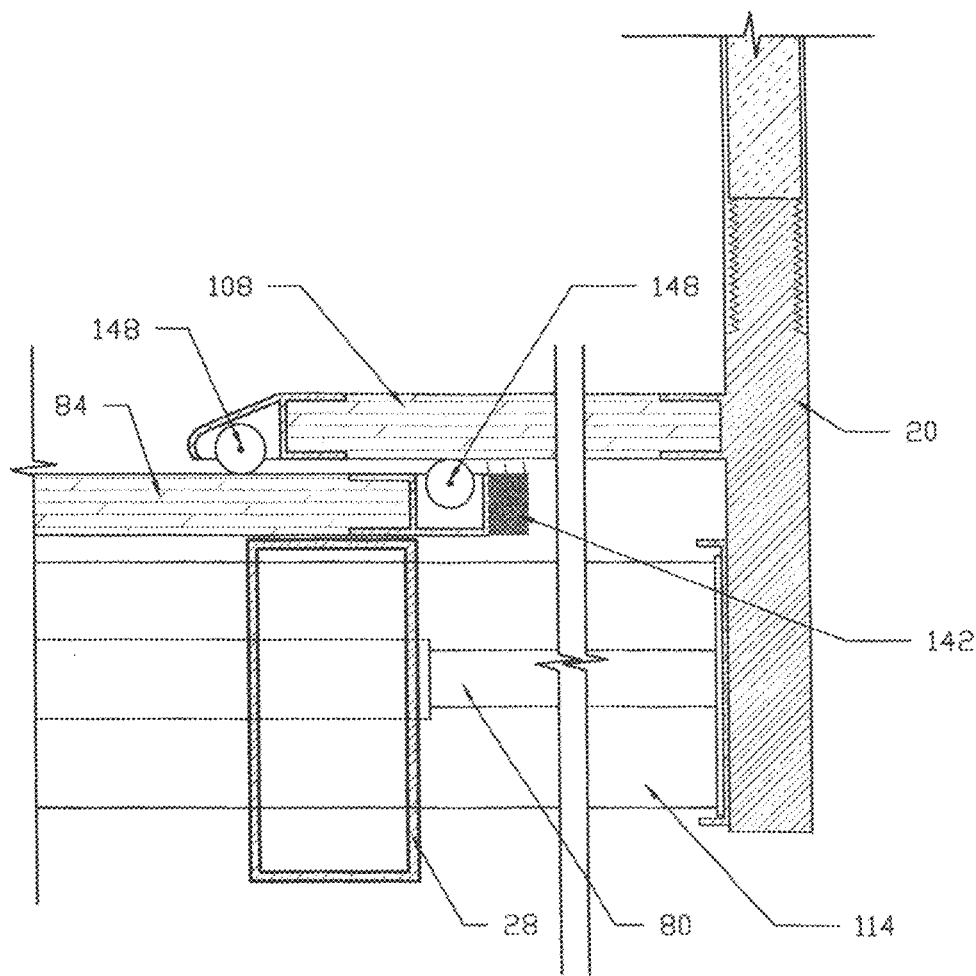
FIG. 13 is a detailed longitudinal cross sectional view of a side module floor a main frame showing the location of two rollers.

As an alternative to the guide rails 98, 100, 114, 116, 130, 132, a plurality of rollers 148, as best illustrated in FIG. 13, are located between, in the example shown, the first side module floor 108 and the main floor 84 to permit rolling movement of the side module floor 108 over the main floor 84. Although not shown, a similar roller system is located between the main floor 84 and the other module floors, i.e. rollers 148 are located between the rear module floor 92, the second side module floor 124 and the main floor 84 to permit rolling movement of the module floors over the main floor.

Thus, the module floors 92, 108, 124 overlap the main floor 84 when the habitation unit 10 is in the closed configuration, and move over the main floor 84 to achieve the open configuration. The roof 24 overlaps the modules 18, 20, 22 in the open configuration and also overlaps the modules 18, 20, 22 in the closed configuration.

Referring now to FIGS. 9, 10, and 11, the roof 24 is connected to the main frame 28 to permit movement along a fourth restricted path of travel. The roof 24 is sized and shaped to cover and overlap the rear module 18, the first side module 20, the second side module 22 and the main floor 84. In the example illustrated, the roof 24 is generally dome-shaped such that in the default configuration, the roof 24 is coplanar with the RV cabin 14. It is desirable to have the habitation unit 12 with a habitation volume that is sufficiently large to permit an enjoyable, non-cramped environment in which to, for example, cook, sleep, eat and bathe. To this end, the habitation volume of the habitation unit 12 is defined by how far apart the roof 24, the rear module 18, the first side module 20 and the second side module 22 are displaced. The novel and unobvious design of the habitation unit 12 permits the user to vary the size of the habitation volume from the overlapped closed default configuration to the first open configuration. Typically, the first open configuration is for use during the day in a stationary position, where maximum available space is required. As best illustrated in FIG. 8, a second open configuration of the habitation unit 12 is typically for use during the night when the first and second side module can be converted into sleeping areas using pull-out beds.

Still referring to FIGS. 9, 10, and 11, the roof 24 is moveable along the fourth restricted path of travel generally orthogonally relative to the respective restricted paths of travel of the rear module 18, the first side module 20 and the second side module 22 so as to vary the size of the habitation volume. In the default overlapped closed configuration, the roof 20, the rear module 18, the first side module 20 and the second side module 22 are located towards each other and define a first habitation volume. In the first open configuration, the roof 20, the rear module 18, the first side module 20 and the second side module 22 are located away from each other and define a second habitation volume. The second habitation volume is almost double the first habitation volume.

The roof 24 is in communication with the four roof actuators 68, 70, 72, and 74 which push it along the fourth restricted path of travel relative to the rear module 18, the first side module 20 and the second side module 22. The roof 20 includes a peripheral sidewall 140 which depends downwardly therefrom. Although the roof 20 is illustrated as dome-shaped, a person skilled in the art will recognize that other roof shapes are possible.

Figure 12A:
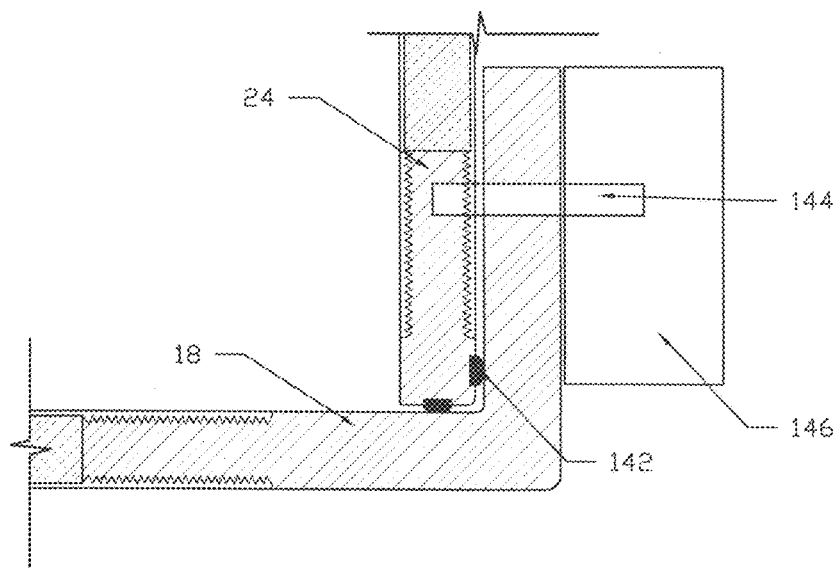
FIG. 12 are detailed longitudinal cross sectional views of an actuatable locking pin in which FIG. 12A (upper drawing) shows the pin used in a closed configuration and FIG. 12B (lower drawing) shows the pin used in an open configuration.
Figure 12B:
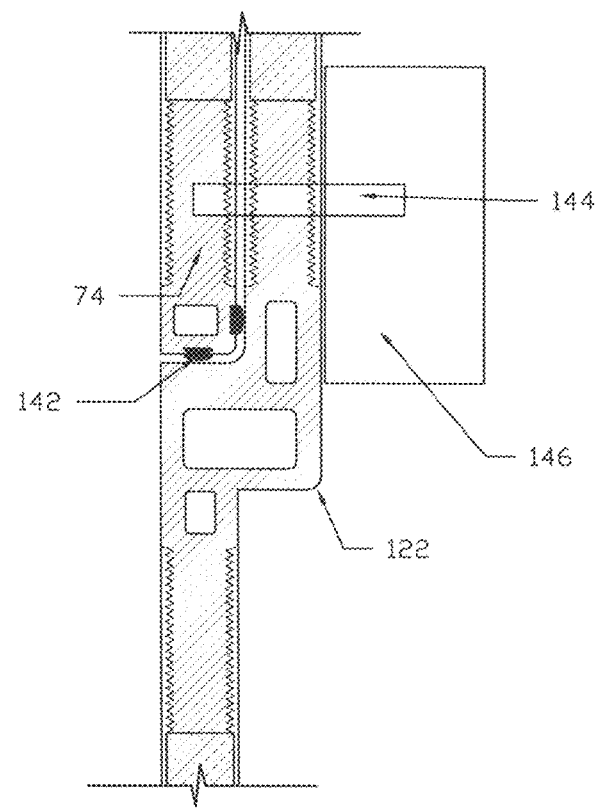

As best seen in FIGS. 9, 11 and 12, in a closed configuration, the peripheral sidewall 140 of the roof 24 sealingly abuts the second step 106 of the rear module 18, the second step 122 of the first side module 20 and the second step 136 of the second side module 22, and sealingly abuts against the rearwardly facing wall 16 of the cabin 14. In the first open configuration, the roof 20 is actuated into a configuration in which the peripheral sidewall 140 sealingly abuts the first step 104 of the rear module 18, the first step 120 of the first side module 20 and the first step 136 of the second side module 22, and sealingly abuts against the rearwardly facing wall 16 of the cabin 14.

Still referring now to FIGS. 11 and 12, a plurality of silicone gaskets 142 temporarily seal the peripheral sidewall 140 to the first steps 104, 120, 136 and the second steps 106, 122, 138 of the rear module 18, the first side module 20 and the second side module 22. The gaskets 142 provide both air tight and watertight seals. An actuatable retractable locking pin 144 locks the roof 20 to the rear module 18, the first side module 20 and the second side module 22 in both the closed configuration and the first open configuration. The locking pin 144 is connected to a motor 146, which is operably connected to the control panel.

The module walls are typically made 1" polyurethane insulation, which is sandwiched between two layers of smooth coated fiberglass and secured at the edges with extruded aluminum profiles. Also, molded plastic walls can be used provided they are sufficiently insulated.

Figure 14:
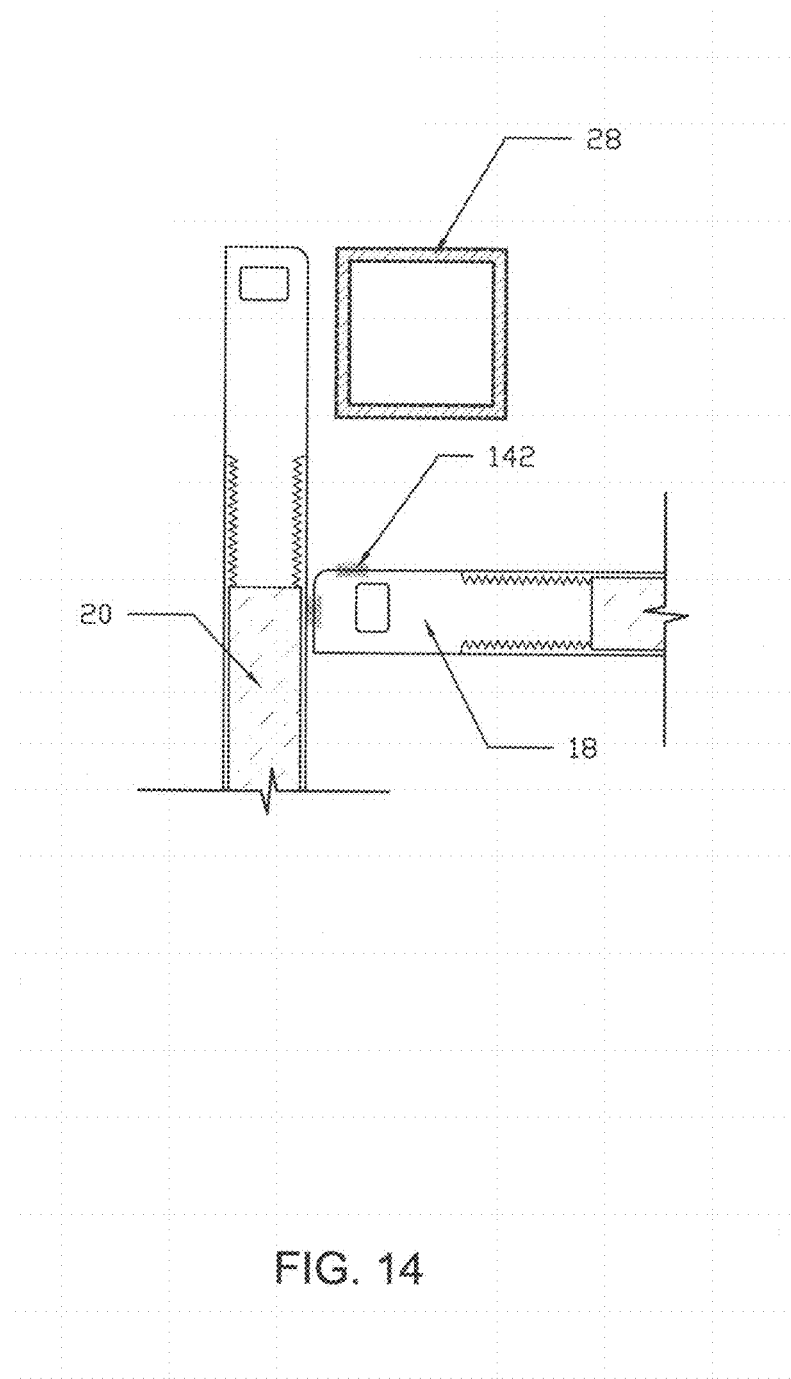
FIG. 14 is a detailed longitudinal cross sectional view of a rear module and a side module showing the location of gaskets.
Figure 15A:
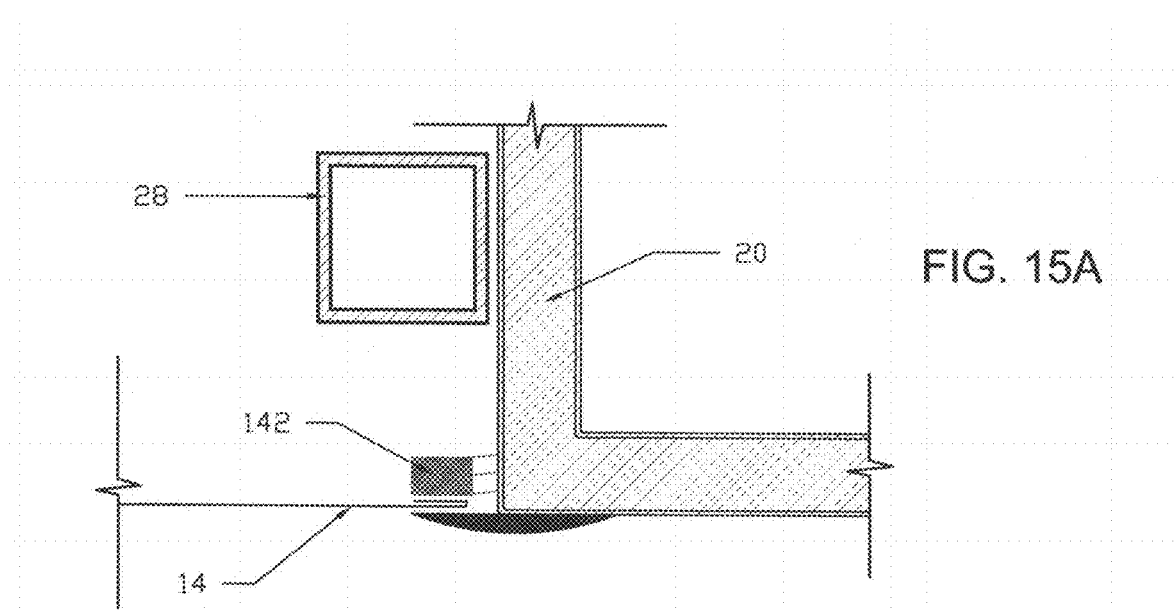
FIG. 15 is a detailed longitudinal cross sectional view of a side module showing movement between a closed configuration (FIG. 15A; top drawing) and an open configuration (FIG. 15B; bottom drawing)
Figure 15B:
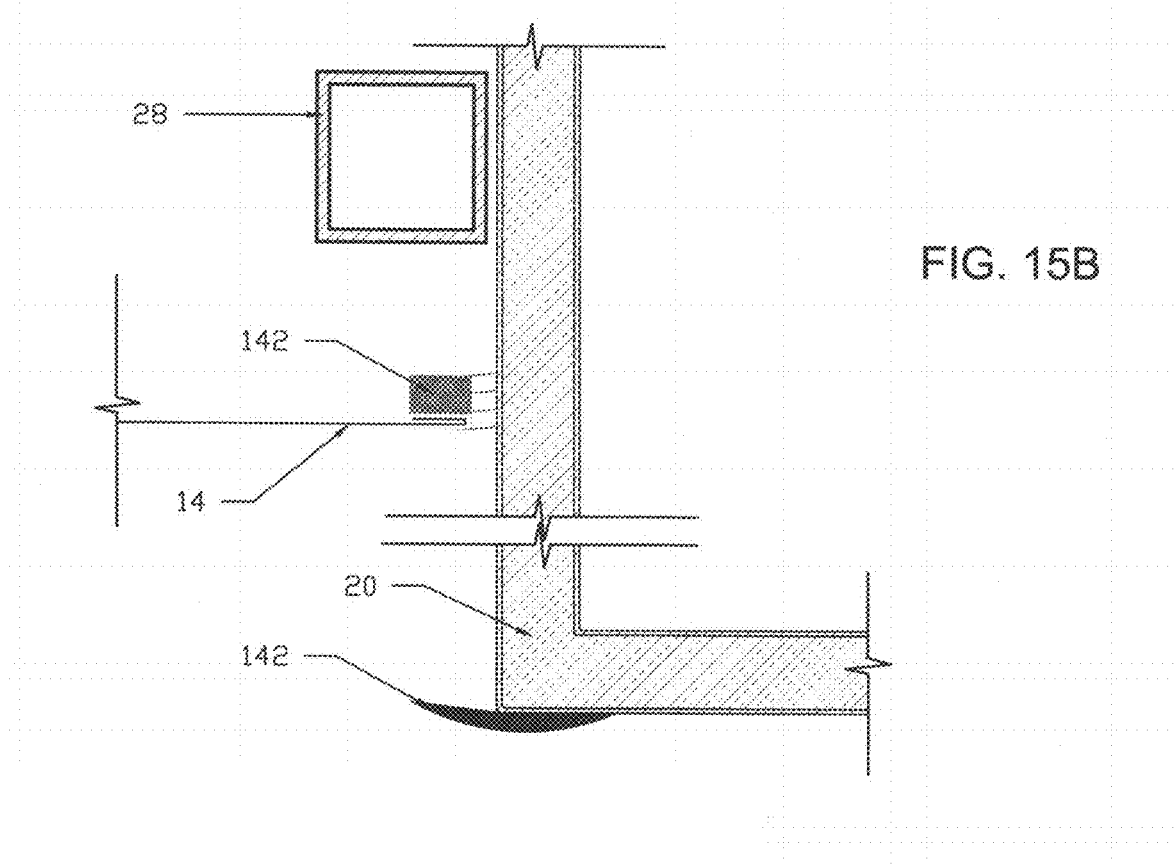

Referring now to FIGS. 12, 14, and 15, there is illustrated detailed diagrammatic representations of the main frame 28 in relation to the side modules 18, 20 and 22 and the location of the gaskets 142. In FIG. 15, the first and second side modules 20, 22 are shown in the open and closed overlapping configuration relative to the main frame 28, and the roof 24 shown in the open and closed overlapping configuration relative to the main frame 28. Furthermore, in FIG. 15, a dual gasket system 142 and 142A permits water drainage and reduced water penetration.

Figure 16:
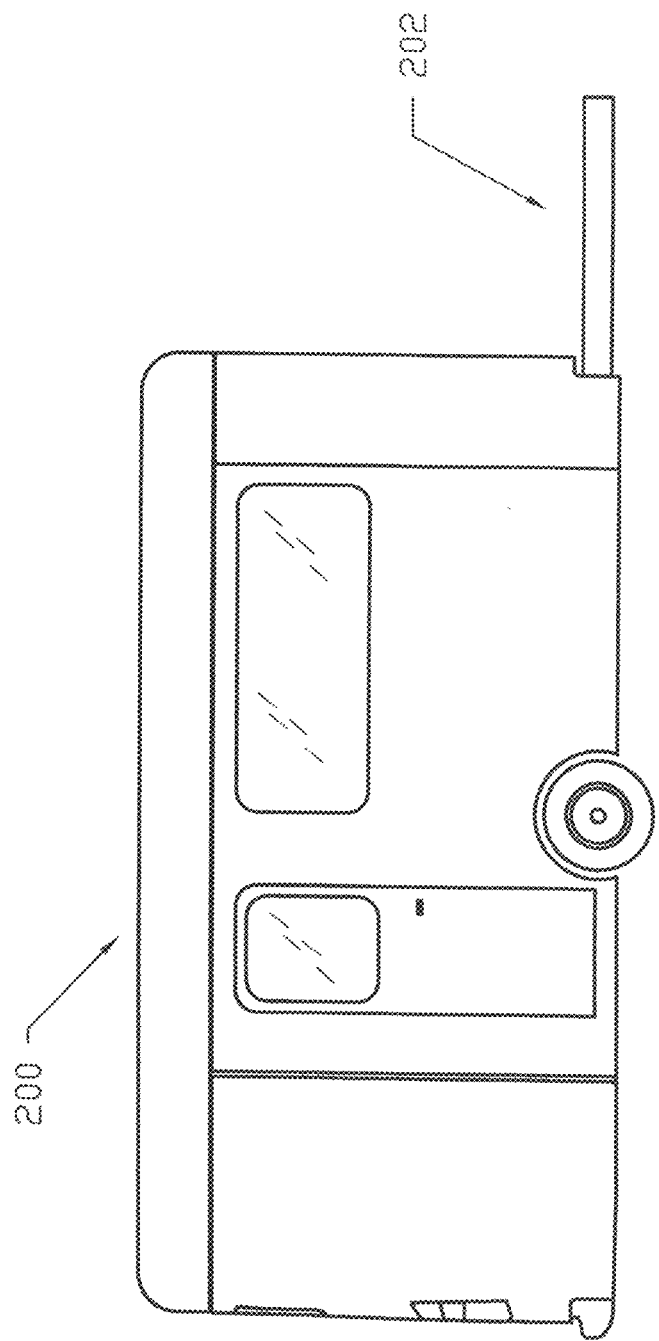
FIG. 16 is a side view of a stand alone habitation unit in a closed configuration.
Figure 17:
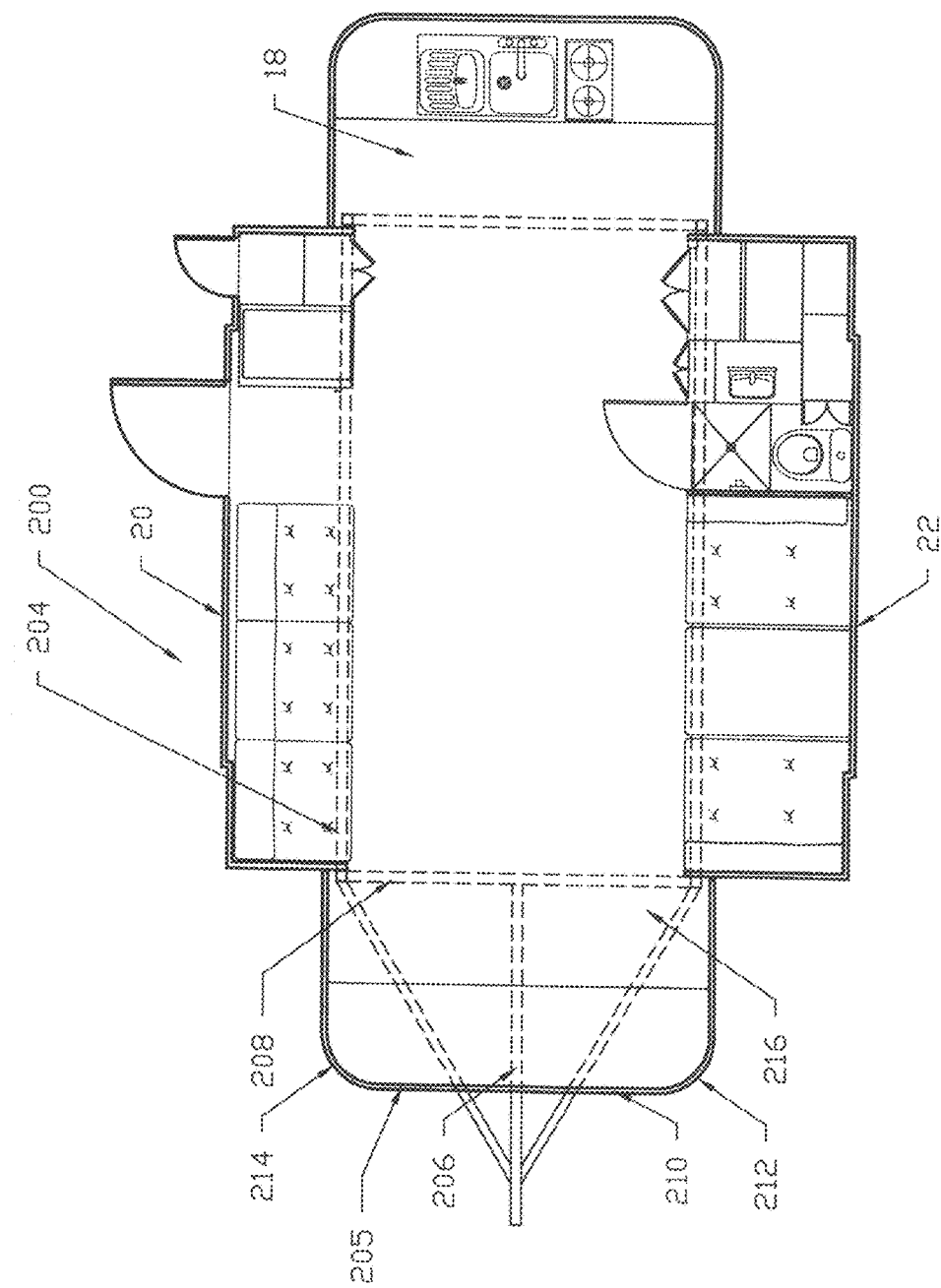
FIG. 17 is a detailed plan view of the stand alone habitation unit of FIG. 16 in an open configuration.
Figure 18:
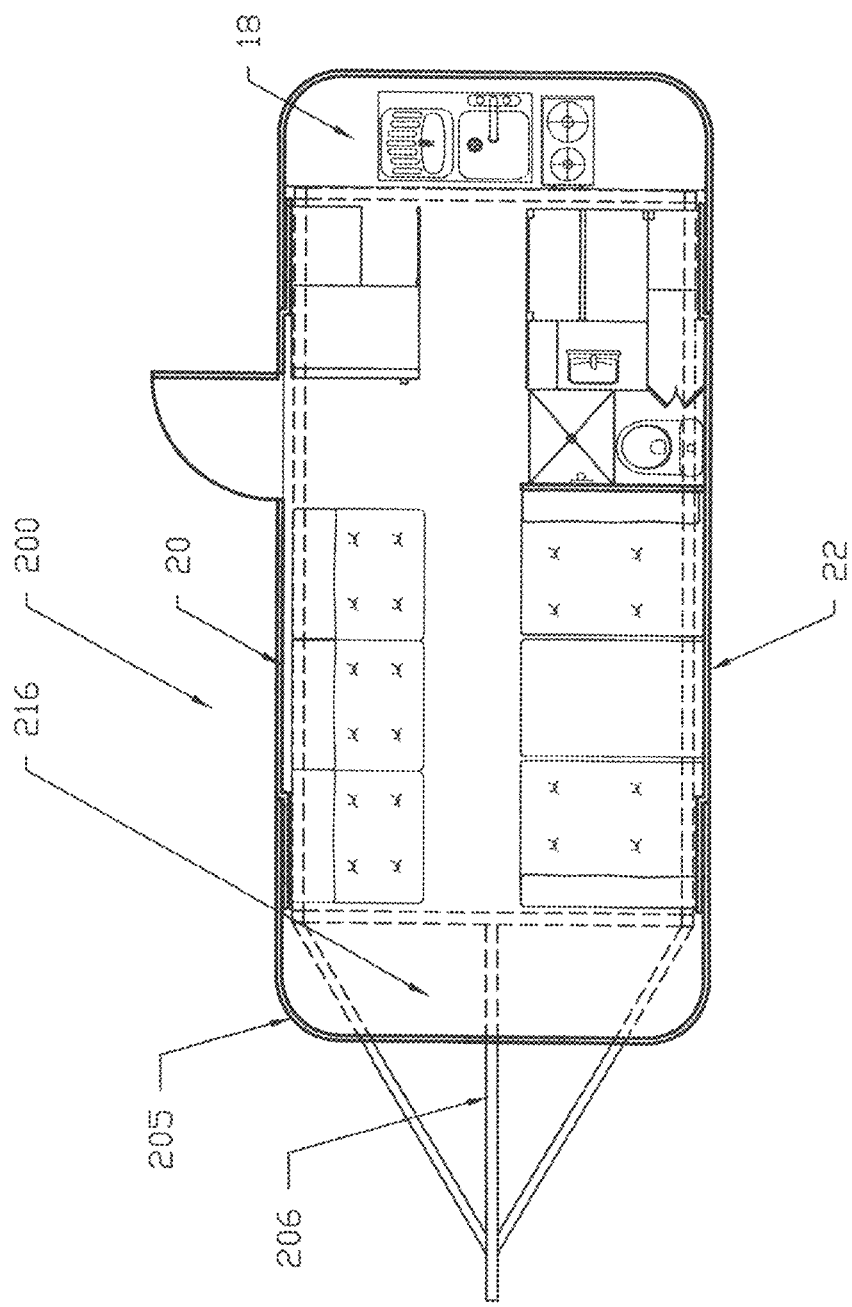
FIG. 18 is a detailed plan view of the stand alone habitation unit of FIG. 16 in a closed configuration.

As illustrated above, the habitation unit 12 is designed for use with the RV 10. Referring now to FIGS. 16, 17 and 18, for users who merely wish to attach a habitation unit to an existing vehicle an alternative, free-standing habitation unit is illustrated generally at 200. The free-standing unit 200 can be hitched to a vehicle using a hitch extension 202 of a main frame 204. The habitation unit 200 is essentially identical to the habitation unit 12 described above, but now includes a front module 205. The salient differences between the two units will now be described. The hitch extension 202 extends away from the main frame 204 and is generally triangular. A central stabilizing connecting shaft 206 is connected to a front cross bar 208 of the main frame 204. Unlike the rearwardly facing wall 16 of the cabin 14, the unit 200 includes a front outer wall 210, which includes two curved corners 212, 214. This outer wall 210 provides an additional habitation area 216 over the hitch extension 202. The habitation unit 200 is operated using a remote control panel (not shown).

Figures 20A, 20B:
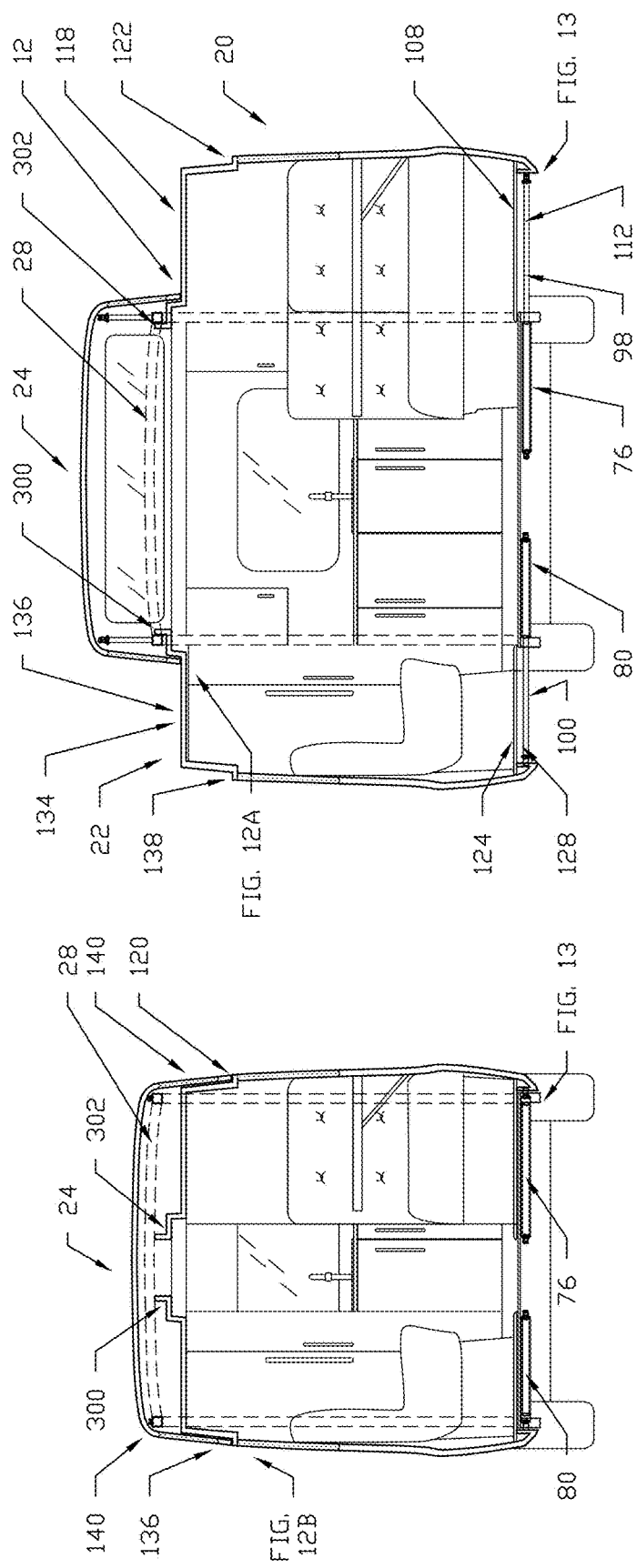
FIG. 20 is a rear cut away detailed view of a habitation unit showing a stepped stabilizing member in which FIG. 20A (left hand side) illustrates the unit in a closed configuration with arrows pointing to views shown in FIG. 12B and FIG. 13, and FIG. 20B (right hand side) illustrates the unit in an open configuration with arrows pointing to views shown in FIG. 12A and FIG. 13 showing the location of the stepped stabilizing member.

Referring now to FIGS. 20A and 20B, as an additional stabilizing modification, each of the side modules 20, 22 includes a stepped stabilizing member 300, 302, which are extensions of the stepped first and second side module roof 118, 134. The stepped stabilizing members 300, 302 run substantially the entire length of each side module 20, 22. As best illustrated in FIG. 20B, in the open configuration, the stepped stabilizing members 300, 302 are disposed generally orthogonal to the ground, to abuttingly engage the main frame 28. The peripheral sidewall 140 of the roof 24 rests on the stepped first side module roof 118, and the stepped second side module roof 134. This provides lateral stability to the side modules 20, 22, and significantly reduces, or essentially eliminates, outward rotation of the side modules 20, 22. In the closed configuration, as best illustrated in FIG. 20A, the stepped stabilizing members 300, 302 are in the default position.

Additional Sleeping Berth

Turning now to the problem of sleeping room for passengers. For the RV 10, as illustrated throughout, the side modules 20, 22 typically provide comfortable sleeping room for about three to four adults, depending on their size. Referring now to FIG. 21A, FIG. 21B, FIG. 21C, FIG. 22 and FIG. 23, to take full advantage of every available space, I have now designed a sleeping compartment 400 by modifying the area above a cabin 402 of the RV 10. The RV 10 includes the cabin 402 with a ceiling 404, a rear wall 406, two doors 408, seats 410, a windshield 412, and the expandable habitation unit 12 located behind the rear wall 406.

Figure 22:
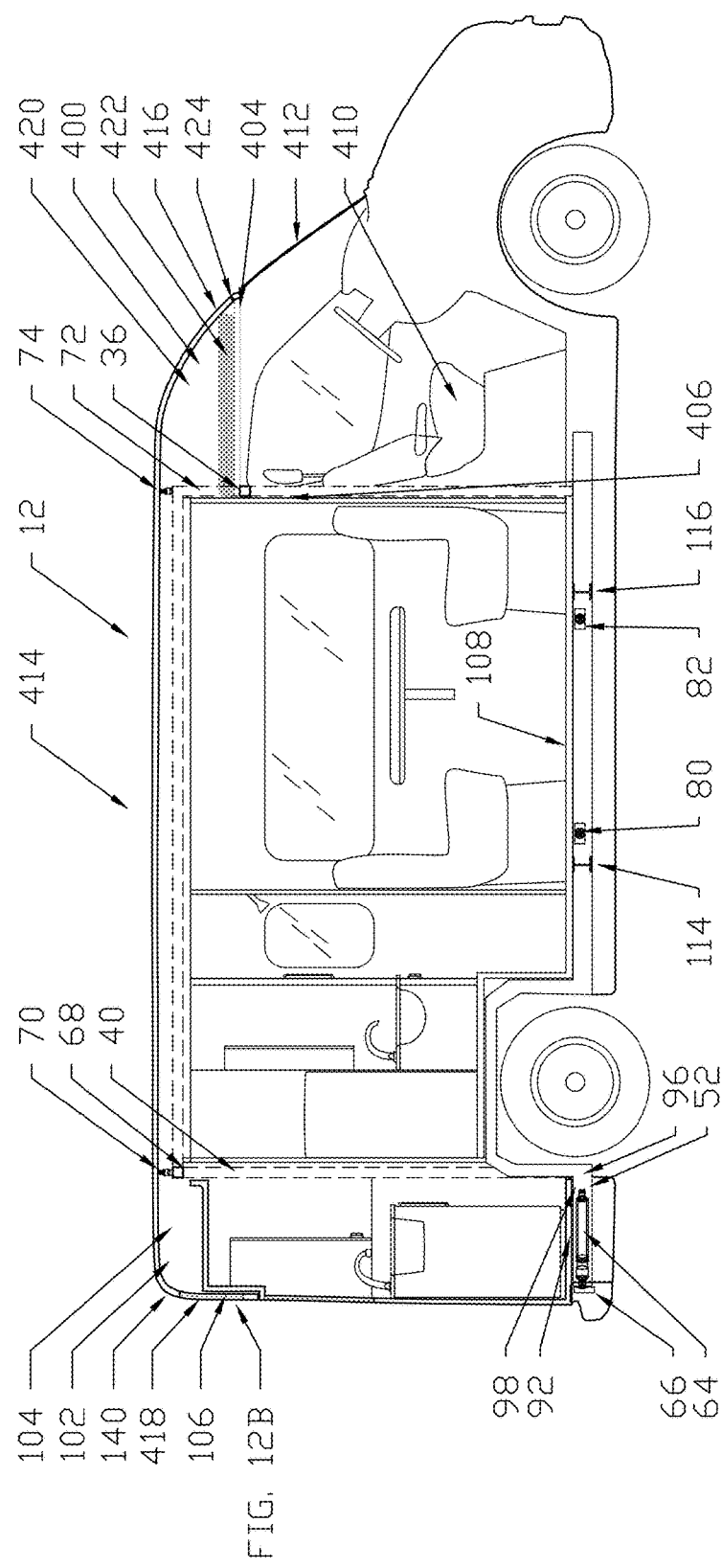
FIG. 22 is a cut away detailed side view of a habitation unit with a front sleeping compartment in a closed configuration showing the location of a plurality of actuators and with an arrow pointing to a view shown in FIG. 12B.
Figure 23:
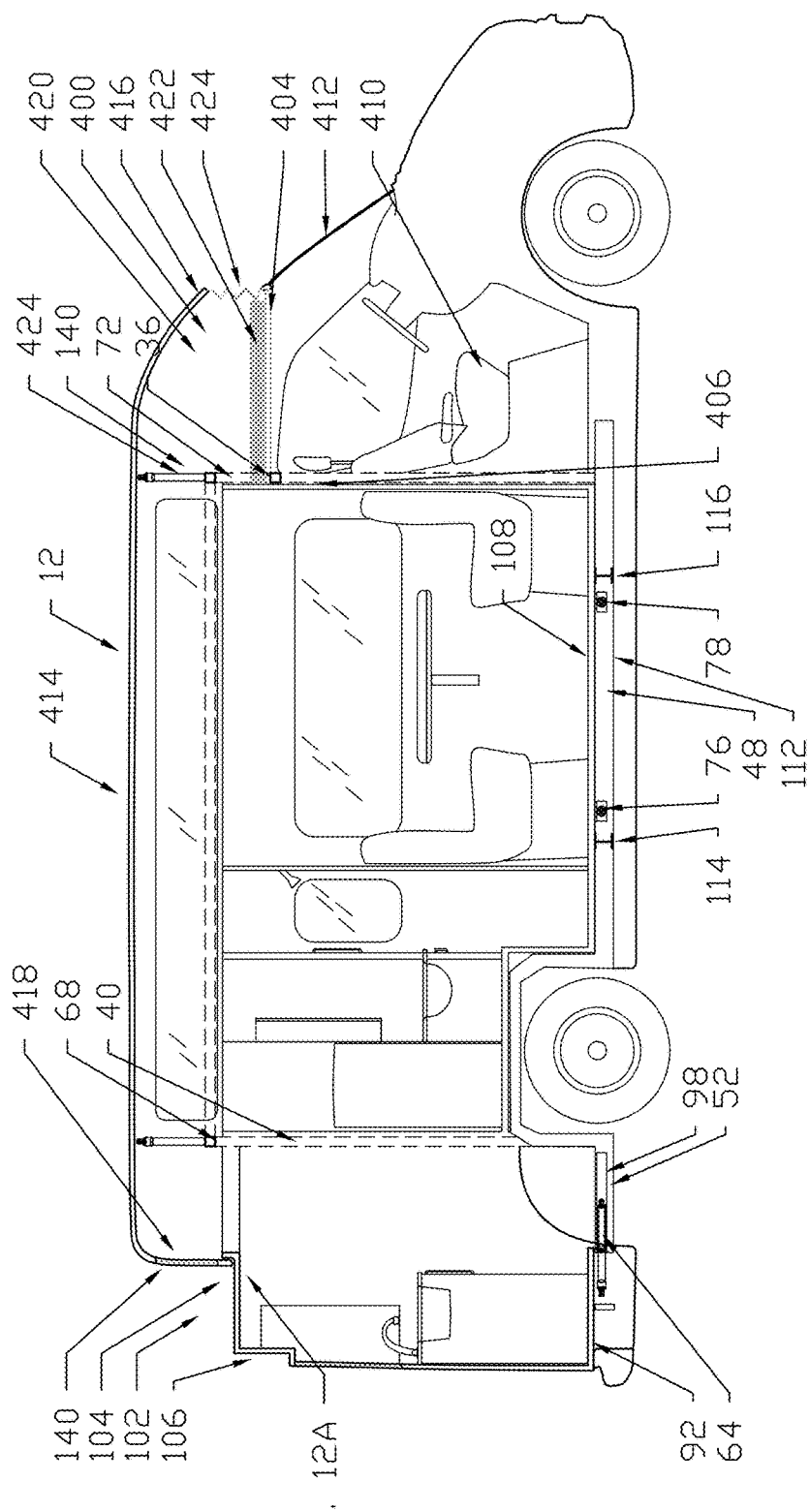
FIG. 23 is a cut away detailed side view of the habitation unit of FIG. 22 in an open configuration showing the actuators fully extended and with an arrow pointing to a view shown in FIG. 12A.

Referring specifically to FIGS. 22 and 23, a roof 414 is sized and shaped to cover both the expandable habitation unit 12 and the cabin 402. As with the roof 20, described above, the roof 414 includes a peripheral sidewall 140, which depends downwardly therefrom. The peripheral sidewall 140 of the roof 414 includes a front roof portion 416 and a rear roof portion 418. The roof 414 is actuatable between a closed configuration and an open configuration. When the roof 414 is fully extended to achieve the open configuration, the sleeping compartment 400 is sufficiently large to accommodate another person. The sleeping compartment 400 includes a sleeping berth 420, which is separate from and independent to the expandable habitation unit 12. The sleeping berth 420 has a sleeping surface 422 located on top of the ceiling 404. The front roof portion 416 is moveably connected to the cabin 402 above the windshield 412 and the doors 406 to permit movement of the roof 414 between the open and closed configuration. The front roof portion 416 is sealingly connected to the cabin 402 using an expandable connector 424. In the example shown, the expandable connector 424 is an accordion-like connector, which is typically made of rubber or silicone. The expandable connector 424 can be any type of expandable connector known to those skilled in the art. In the open configuration, the expandable connector 424 is disposed generally orthogonal to the sleeping surface 422. In the open configuration, an access opening 426 is located rearwardly of the sleeping berth 420. The access opening 426 is sized to permit a user to move into and out of the sleeping berth 420. To maintain a level of privacy for the occupant, the access opening 426 separates the expandable habitation unit 12 from the sleeping berth 420.

Referring now to FIGS. 21A and 22, in the closed configuration, the front roof portion 416 is disposed coplanar with the windshield 412 to create an aerodynamic surface so as to reduce drag on the RV when it is moving.

Referring again to FIGS. 22 and 23, the spaced apart roof actuators 68, 70, 72, 74 are essentially identical to those described in FIGS. 9, 10 and 11 above. The two front actuators 72, 74 when extended fully in this design are longer than the actuators described above, to account for the height of the sleeping compartment 400, and to provide the sleeping compartment with sufficient volume so that the occupant does not feel claustrophobic. In the examples illustrated, the actuators 64, 66, 68, 70, 72, 74, 76, 78, 80, 82 are, without limitation, hydraulic pistons which are operably connected to the control panel so that they can received commands therefrom. A person skilled in the art will recognize that different types of actuators can be used, for example, worm gears, sprocket and gear and the like.

The habitation unit 12 in this design is essentially identical to that described above, and as such will not be described in detail here other than to say that the two side modules 20, 22, the rear module 18, and the roof 414 are moveable along respective restrictive paths of travel and that the roof 414 is connected to the main frame to permit movement along a roof restricted path of travel such that in the closed configuration, the roof 414, the modules 18, 20, 22 and the sleeping berth 420 define a first habitation volume. The roof 414 is moveable along the roof restricted path of travel orthogonally relative to the respective restricted paths of travel of the modules so as to vary the size of the first habitation volume. In response to a first user command, the actuators move the modules and the roof away from each other along the respective restricted paths of travel from a default overlapped closed habitation configuration to a first open configuration. In response to a second user command, the actuators moves the modules and the roof towards from each other along the respective restricted paths of travel from the first open configuration to the overlapped default closed configuration.

Operation

Referring now to FIGS. 19A through 19D, there will now be described an operation of the habitation unit 12. The operation of the alternative habitation unit 200 is identical to that of the unit 12, and will not be described. In the example illustrated, the control panel is located in the cab 14. The controller can be an on-board computer, a remote control device operable using Wi-Fi, Bluetooth™ and the like. In the free-standing design 200, the controller can be a hand-held electronic device such as a smartphone, a tablet, and the like, which the user uses to control the habitation unit 12. For the stand alone design 200, the central control panel could be fixed to the hitch extension 202 or integrated into one of the modules.

Broadly speaking, the main frame 28, the rear module 18, the first side module 20, the second side module 22 and the roof 24 are each interconnected to at least two of the actuators described above such that in response to a first user command given at, for example the control panel, the actuators moves the modules and the roof away from each other along their respective restricted paths of travel from the overlapped default closed habitation configuration to a first open configuration. When desired, the controller issues a second user command so that the main frame, the rear module, the first side module, the second side module and the roof are each interconnected to at least two actuators such that in response to a second user command, the actuators moves the modules and the roof towards each other along the respective restricted paths of travel from the open configuration to the overlapped closed configuration.

Inside the driver's cabin, a central control panel controls the leveling and opening sequences of the vehicle. When the vehicle is moving, the habitation unit 10 is in the overlapped default closed position with the rear module, the roof, the first and second side modules closed and locked. An interlock with the engine/transmission prevents the opening sequences when driving the vehicle.

Once stopped and parked, the vehicle is leveled with four jacks, one in each corner. The leveling is carried out automatically from the control panel. The jacks are operated by actuators, which can be hydraulic or mechanical. The modules are then unlocked. The opening sequence is as follows with reference to FIGS. 19A through 19D.

Figure 19A:
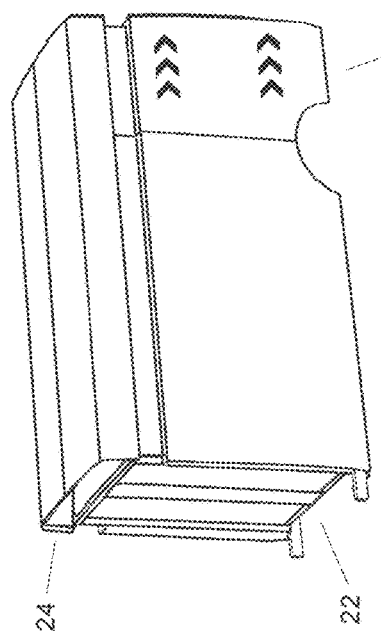

Firstly in FIG. 19A, the roof module 24 is opened to a maximum height position by the four actuators, one in each corner of the main frame in the direction of the arrows shown.

Figure 19B:
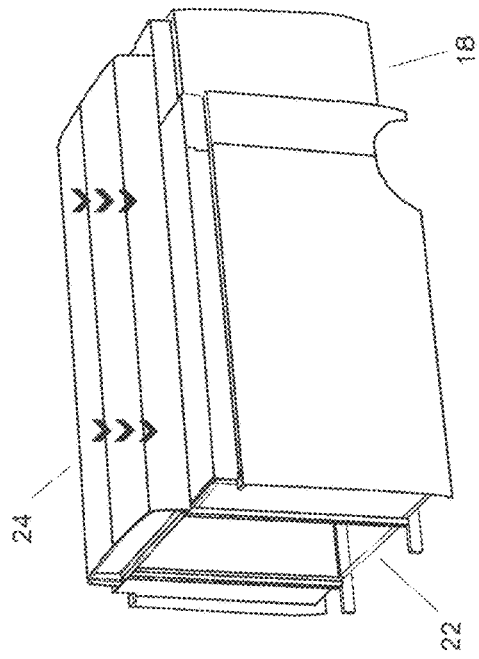

Second in FIG. 19B, the rear kitchen module 18 is opened to maximum position in the direction of the arrows. It is supported and guided by the two guide rails below the floor level. The two actuators push the lower frame of the rear module outward. The floor of the module is also supported by rollers on the edge of the main rigid RV floor.

Figure 19C:
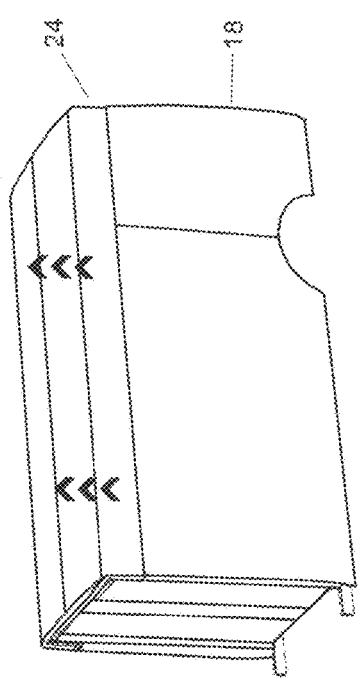

Third in FIG. 19C, the two dining/bath and living side modules (only the side module 22 is shown) open simultaneously outward to maximum position in the direction of the arrows until the roof upright 302 stops at frame 28. They are each supported and guided by the two guide rails below the floor level. The two actuators per side module push the lower frame of the modules outward. The rollers 148 on the edge of the rigid RV floor also support the floor of each side module.

Figure 19D:
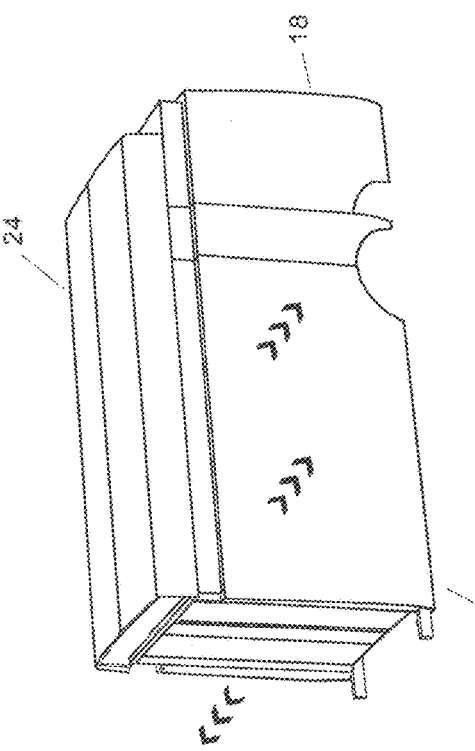

Fourth in FIG. 19D, the roof 24 is lowered in the direction of the arrows to overlap and sealingly rest on the three lower module roofs.

Finally, the modules are then locked together to secure the unit and prevent movement between modules.

To close the RV and get ready for driving, the sequence is reversed.

Other Embodiments

From the foregoing description, it will be apparent to one of ordinary skill in the art that variations and modifications may be made to the embodiments described herein to adapt it to various usages and conditions.

What is claimed is:

1. A sleeping compartment for a recreational vehicle having a cabin with a ceiling, two doors, seats, a windshield, and an expandable habitation unit located behind the cabin, the sleeping compartment comprising:
    a roof module sized and shaped to cover the expandable habitation unit and the cabin, the roof module having a front roof portion and a rear roof portion, the roof module being actuatable between a default closed configuration and an open configuration; and
    a sleeping berth separate from and independent to the expandable habitation unit, the sleeping berth having a sleeping surface located on top of the ceiling, the front roof portion being moveably connected to the driver's cabin above the windshield and the doors to permit movement of the roof module between the open and closed configuration;
    the habitation unit includes two side modules, a rear module, and a main frame, the side modules and the roof module being moveable along respective restrictive paths of travel; the roof module being connected to the main frame to permit movement along a roof restricted path of travel such that in the default closed configuration, the roof module, the rear and side modules and the sleeping berth define a first habitation volume in which the roof module overlaps the two side modules and the rear module, the roof module being moveable along the roof restricted path of travel orthogonally relative to the respective restricted paths of travel of the modules so as to vary the size of the first habitation volume.

2. The sleeping compartment, according to claim 1, in which the front roof portion is sealingly connected to the cabin.

3. The sleeping compartment, according to claim 2, in which an expandable connector is sealingly connected to the cabin.

4. The sleeping compartment, according to claim 3, in which the expandable connector is an accordion-like connector.

5. The sleeping compartment, according to claim 4, in which in the open configuration the accordion-like connector is disposed generally orthogonal to the sleeping surface.

6. The sleeping compartment, according to claim 1, in which in the open configuration an access opening is located rearwardly of the sleeping berth, the access opening being sized to permit a user to move into and out of the sleeping berth, the access opening separates the expandable habitation unit from the sleeping berth.

7. The sleeping compartment, according to claim 1, in which in the default closed configuration, the front roof portion is disposed coplanar with the windshield to create an aerodynamic surface.

8. The sleeping compartment, according to claim 1, in which the main frame, the rear module, the first side module, the second side module and the roof are each interconnected to at least two actuators such that in response to a first user command, the actuators moves the modules away from each other in sequence along their respective restricted paths of travel from the default closed configuration to an open configuration.

9. The sleeping compartment, according to claim 8, in which the main frame, the rear module, the first side module, the second side module and the roof module are each interconnected to at least two actuators such that in response to a second user command, the actuators move the modules towards each other in sequence along their respective restricted paths of travel from the open configuration to the default closed configuration.

10. The sleeping compartment, according to claim 1, in which the main frame is a cuboid frame.

11. The sleeping compartment, according to claim 10, in which the cuboid frame includes:
    a front frame portion having mounted thereon two lower actuators and two upper actuators, the two upper actuators being disposed generally orthogonal to the two lower actuators; and
    a rear frame portion having mounted thereon two lower actuators and two upper actuators, the two upper actuators being disposed orthogonal to the two lower actuators.

12. The sleeping compartment, according to claim 11, in which the two front and rear lower actuators are connected to the first and second side modules.

13. The sleeping compartment, according to claim 11, in which the front roof portion is angled away from the two upper actuators.

14. The sleeping compartment, according to claim 11, in which the actuators are hydraulic pistons.

15. A recreational vehicle having a cabin with a ceiling, two doors, seats, and a windshield, the recreational vehicle comprising:
    a main frame mounted on a vehicle subframe;
    a main floor;
    an expandable habitation unit having two side modules, and a rear module, each module being in communication with the main floor to permit movement thereover along respective restricted paths of travel;
    a roof module sized and shaped to cover and overlap the expandable habitation unit and the cabin, the roof module having a front roof portion and a rear roof portion, the roof being actuatable between a default closed configuration and an open configuration; and
    a sleeping berth separate from and independent to the expandable habitation unit, the sleeping berth having a sleeping surface located on top of the ceiling, the front roof portion being moveably connected to the cabin above the windshield and the doors to permit movement of the roof between the open and the default closed configuration.

16. The recreational vehicle, according to claim 15, in which the front roof portion is sealingly connected to the cabin.

17. The recreational vehicle, according to claim 16, in which an expandable connector is sealingly connected to the cabin.

18. The recreational vehicle, according to claim 17, in which the expandable connector is an accordion-like connector.

19. The recreational vehicle, according to claim 15, in which in the open configuration the accordion-like connector is disposed generally orthogonal to the sleeping surface.

* * * * *